US011486268B2

(12) United States Patent
Naik et al.

(10) Patent No.: US 11,486,268 B2
(45) Date of Patent: Nov. 1, 2022

(54) TURBOCHARGER ASSEMBLY

(71) Applicant: Garrett Transportation I Inc., Torrance, CA (US)

(72) Inventors: Sachinkumar Babu Naik, Bengaluru (IN); Shankar Pandurangasa Solanki, Bengaluru (IN); Saneel Rajan Gandhi, Pune (IN); Joel Castan, Chantraine (FR)

(73) Assignee: Garrett Transportation I Inc., Torrance, CA (US)

( * ) Notice: Subject to any disclaimer, the term of this patent is extended or adjusted under 35 U.S.C. 154(b) by 1145 days.

(21) Appl. No.: 15/871,677

(22) Filed: Jan. 15, 2018

(65) Prior Publication Data
US 2019/0218934 A1     Jul. 18, 2019

(51) Int. Cl.
*F01D 25/16* (2006.01)
*F02C 7/06* (2006.01)
(Continued)

(52) U.S. Cl.
CPC ......... *F01D 25/162* (2013.01); *F01D 25/166* (2013.01); *F01D 25/24* (2013.01); *F02C 6/12* (2013.01); *F02C 7/06* (2013.01); *F16C 35/06* (2013.01); *F02B 37/00* (2013.01); *F05D 2220/40* (2013.01); *F05D 2230/64* (2013.01); *F05D 2240/60* (2013.01);
(Continued)

(58) Field of Classification Search
CPC ...... F01D 25/162; F01D 25/166; F01D 25/24; F16C 35/02; F16C 35/06; F16C 2360/24; F02B 37/00; F05D 2220/40; F05D 2230/64; F04D 29/056
See application file for complete search history.

(56) References Cited

U.S. PATENT DOCUMENTS 8,186,947 B2    5/2012  Mathieu
8,449,199 B2 *  5/2013  Barlog ................. F16C 19/184
                                            384/512
(Continued)

FOREIGN PATENT DOCUMENTS

CN      107 524 480 A    12/2017
EP      1 582 755 A2     10/2005
(Continued)

OTHER PUBLICATIONS

EP Application No. 19151651.7-1006, European Search Report, dated Apr. 15, 2019 (8 pages).

*Primary Examiner* — Topaz L. Elliott
*Assistant Examiner* — Aye S Htay
(74) *Attorney, Agent, or Firm* — Brian J. Pangrle

(57) ABSTRACT

A turbocharger includes a center housing that includes a through bore and a stepped locating pin socket that includes a stop surface; a bearing disposed in the through bore where the bearing includes an opening; and a stepped locating pin where the stepped locating pin includes a pin portion received in part by the opening of the bearing and a seating portion secured via an interference fit in the stepped locating pin socket where a maximum radius of the seating portion exceeds a maximum radius of the pin portion and where the stepped locating pin includes a stop surface that contacts the stop surface of the stepped locating pin socket to axially position the stepped locating pin in the stepped locating pin socket.

16 Claims, 15 Drawing Sheets

(51) Int. Cl.
  *F02C 6/12*   (2006.01)
  *F01D 25/24*  (2006.01)
  *F16C 35/06*  (2006.01)
  *F02B 37/00*  (2006.01)

(52) U.S. Cl.
  CPC ...... *F05D 2260/30* (2013.01); *F05D 2260/37* (2013.01); *F16C 2360/24* (2013.01)

(56) References Cited

U.S. PATENT DOCUMENTS

| | | | |
|---|---|---|---|
| 9,051,848 B2* | 6/2015 | Castan | F01D 25/162 |
| 9,140,185 B2* | 9/2015 | Castan | F16C 35/02 |
| 9,810,231 B2* | 11/2017 | Daguin | F01D 25/162 |
| 2007/0003175 A1 | 1/2007 | Petitjean et al. | |
| 2009/0060726 A1 | 3/2009 | Severin et al. | |
| 2010/0068053 A1* | 3/2010 | Mathieu | F01D 25/166 |
| | | | 415/229 |
| 2012/0246905 A1 | 10/2012 | Castan et al. | |
| 2013/0115080 A1 | 5/2013 | Castan et al. | |
| 2015/0167690 A1* | 6/2015 | V | F01D 25/162 |
| | | | 415/170.1 |
| 2017/0159708 A1 | 6/2017 | Uneura et al. | |

FOREIGN PATENT DOCUMENTS

| | | |
|---|---|---|
| EP | 1 582 755 A3 | 10/2005 |
| EP | 2 131 053 A1 | 12/2009 |
| EP | 2 592 291 A2 | 5/2013 |
| EP | 2 592 291 A3 | 7/2013 |
| JP | 2011 236967 A | 11/2011 |
| WO | 2018 091629 A1 | 5/2018 |

* cited by examiner

TURBOCHARGER ASSEMBLY

TECHNICAL FIELD

Subject matter disclosed herein relates generally to turbocharger components for internal combustion engines.

BACKGROUND

A turbocharger can include a rotating group that includes a turbine wheel and a compressor wheel that are connected to one another by a shaft. For example, a turbine wheel can be welded or otherwise connected to a shaft to form a shaft and wheel assembly (SWA) and a compressor wheel can be fit to the free end of the shaft. An electric compressor can include one or more compressor wheels that are connected to a shaft or shafts that can be driven by an electric motor. As an example, a shaft that is attached to one or more bladed wheels may be supported by one or more bearings disposed in a bearing housing, which may form a center housing rotating assembly (CHRA). During operation of a turbocharger or an electric compressor, depending on factors such as size of various components, a shaft may be expected to rotate at speeds in excess of 200,000 rpm. To ensure proper rotordynamic performance, a rotating group should be well balanced, well supported and well lubricated over a wide range of conditions (e.g., operational, temperature, pressure, etc.).

BRIEF DESCRIPTION OF THE DRAWINGS

A more complete understanding of the various methods, devices, assemblies, systems, arrangements, etc., described herein, and equivalents thereof, may be had by reference to the following detailed description when taken in conjunction with examples shown in the accompanying drawings where.

DETAILED DESCRIPTION

Below, an example of a turbocharged engine system is described followed by various examples of components, assemblies, methods, etc.

Figure 1:
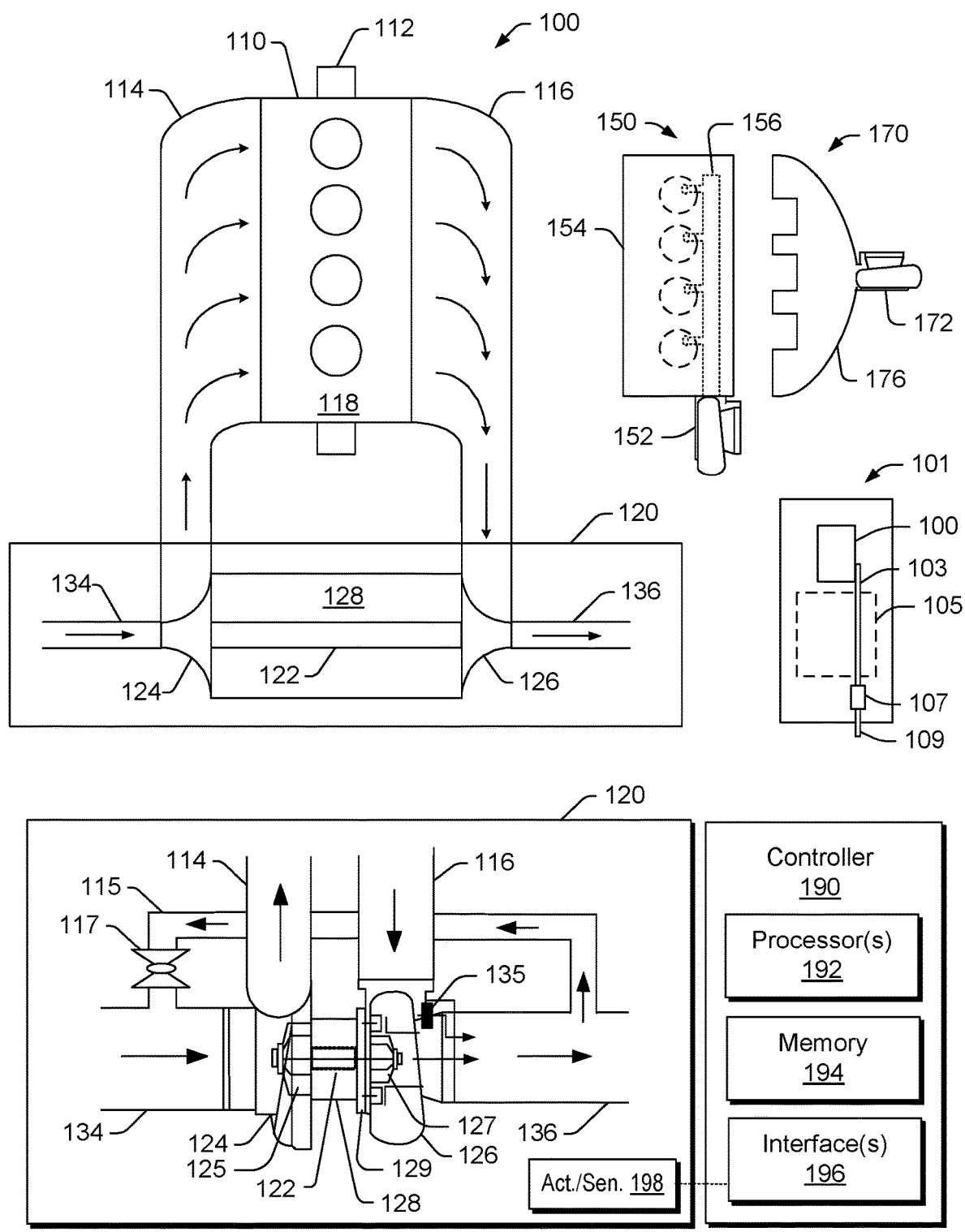
FIG. 1 is a diagram of a turbocharger and an internal combustion engine along with a controller.

Turbochargers are frequently utilized to increase output of an internal combustion engine. Referring to FIG. 1, as an example, a system 100 can include an internal combustion engine 110 and a turbocharger 120. As shown in FIG. 1, the system 100 may be part of a vehicle 101 where the system 100 is disposed in an engine compartment and connected to an exhaust conduit 103 that directs exhaust to an exhaust outlet 109, for example, located behind a passenger compartment 105. In the example of FIG. 1, a treatment unit 107 may be provided to treat exhaust (e.g., to reduce emissions via catalytic conversion of molecules, etc.).

As shown in FIG. 1, the internal combustion engine 110 includes an engine block 118 housing one or more combustion chambers that operatively drive a shaft 112 (e.g., via pistons) as well as an intake port 114 that provides a flow path for air to the engine block 118 and an exhaust port 116 that provides a flow path for exhaust from the engine block 118.

The turbocharger 120 can act to extract energy from the exhaust and to provide energy to intake air, which may be combined with fuel to form combustion gas. As shown in FIG. 1, the turbocharger 120 includes an air inlet 134, a shaft 122, a compressor housing assembly 124 for a compressor wheel 125, a turbine housing assembly 126 for a turbine wheel 127, another housing assembly 128 and an exhaust outlet 136. The housing assembly 128 may be referred to as a center housing assembly as it is disposed between the compressor housing assembly 124 and the turbine housing assembly 126.

In FIG. 1, the shaft 122 may be a shaft assembly that includes a variety of components (e.g., consider a shaft and wheel assembly (SWA) where the turbine wheel 127 is welded to the shaft 122, etc.). As an example, the shaft 122 may be rotatably supported by a bearing system (e.g., journal bearing(s), rolling element bearing(s), etc.) disposed in the housing assembly 128 (e.g., in a bore defined by one or more bore walls) such that rotation of the turbine wheel 127 causes rotation of the compressor wheel 125 (e.g., as rotatably coupled by the shaft 122). As an example a center housing rotating assembly (CHRA) can include the compressor wheel 125, the turbine wheel 127, the shaft 122, the housing assembly 128 and various other components (e.g., a compressor side plate disposed at an axial location between the compressor wheel 125 and the housing assembly 128).

In the example of FIG. 1, a variable geometry assembly 129 is shown as being, in part, disposed between the housing assembly 128 and the housing assembly 126. Such a variable geometry assembly may include vanes or other components to vary geometry of passages that lead to a turbine wheel space in the turbine housing assembly 126. As an example, a variable geometry compressor assembly may be provided.

In the example of FIG. 1, a wastegate valve (or simply wastegate) 135 is positioned proximate to an exhaust inlet of the turbine housing assembly 126. The wastegate valve 135 can be controlled to allow at least some exhaust from the exhaust port 116 to bypass the turbine wheel 127. Various wastegates, wastegate components, etc., may be applied to a conventional fixed nozzle turbine, a fixed-vaned nozzle turbine, a variable nozzle turbine, a twin scroll turbocharger, etc. As an example, a wastegate may be an internal wastegate (e.g., at least partially internal to a turbine housing). As an example, a wastegate may be an external wastegate (e.g., operatively coupled to a conduit in fluid communication with a turbine housing).

In the example of FIG. 1, an exhaust gas recirculation (EGR) conduit 115 is also shown, which may be provided, optionally with one or more valves 117, for example, to allow exhaust to flow to a position upstream the compressor wheel 125.

FIG. 1 also shows an example arrangement 150 for flow of exhaust to an exhaust turbine housing assembly 152 and another example arrangement 170 for flow of exhaust to an exhaust turbine housing assembly 172. In the arrangement 150, a cylinder head 154 includes passages 156 within to direct exhaust from cylinders to the turbine housing assembly 152 while in the arrangement 170, a manifold 176 provides for mounting of the turbine housing assembly 172, for example, without any separate, intermediate length of exhaust piping. In the example arrangements 150 and 170, the turbine housing assemblies 152 and 172 may be configured for use with a wastegate, variable geometry assembly, etc.

In FIG. 1, an example of a controller 190 is shown as including one or more processors 192, memory 194 and one or more interfaces 196. Such a controller may include circuitry such as circuitry of an engine control unit (ECU). As described herein, various methods or techniques may optionally be implemented in conjunction with a controller, for example, through control logic. Control logic may depend on one or more engine operating conditions (e.g., turbo rpm, engine rpm, temperature, load, lubricant, cooling, etc.). For example, sensors may transmit information to the controller 190 via the one or more interfaces 196. Control logic may rely on such information and, in turn, the controller 190 may output control signals to control engine operation. The controller 190 may be configured to control lubricant flow, temperature, a variable geometry assembly (e.g., variable geometry compressor or turbine), a wastegate (e.g., via an actuator), an electric motor, or one or more other components associated with an engine, a turbocharger (or turbochargers), etc. As an example, the turbocharger 120 may include one or more actuators and/or one or more sensors 198 that may be, for example, coupled to an interface or interfaces 196 of the controller 190. As an example, the wastegate 135 may be controlled by a controller that includes an actuator responsive to an electrical signal, a pressure signal, etc. As an example, an actuator for a wastegate may be a mechanical actuator, for example, that may operate without a need for electrical power (e.g., consider a mechanical actuator configured to respond to a pressure signal supplied via a conduit).

Figure 2:
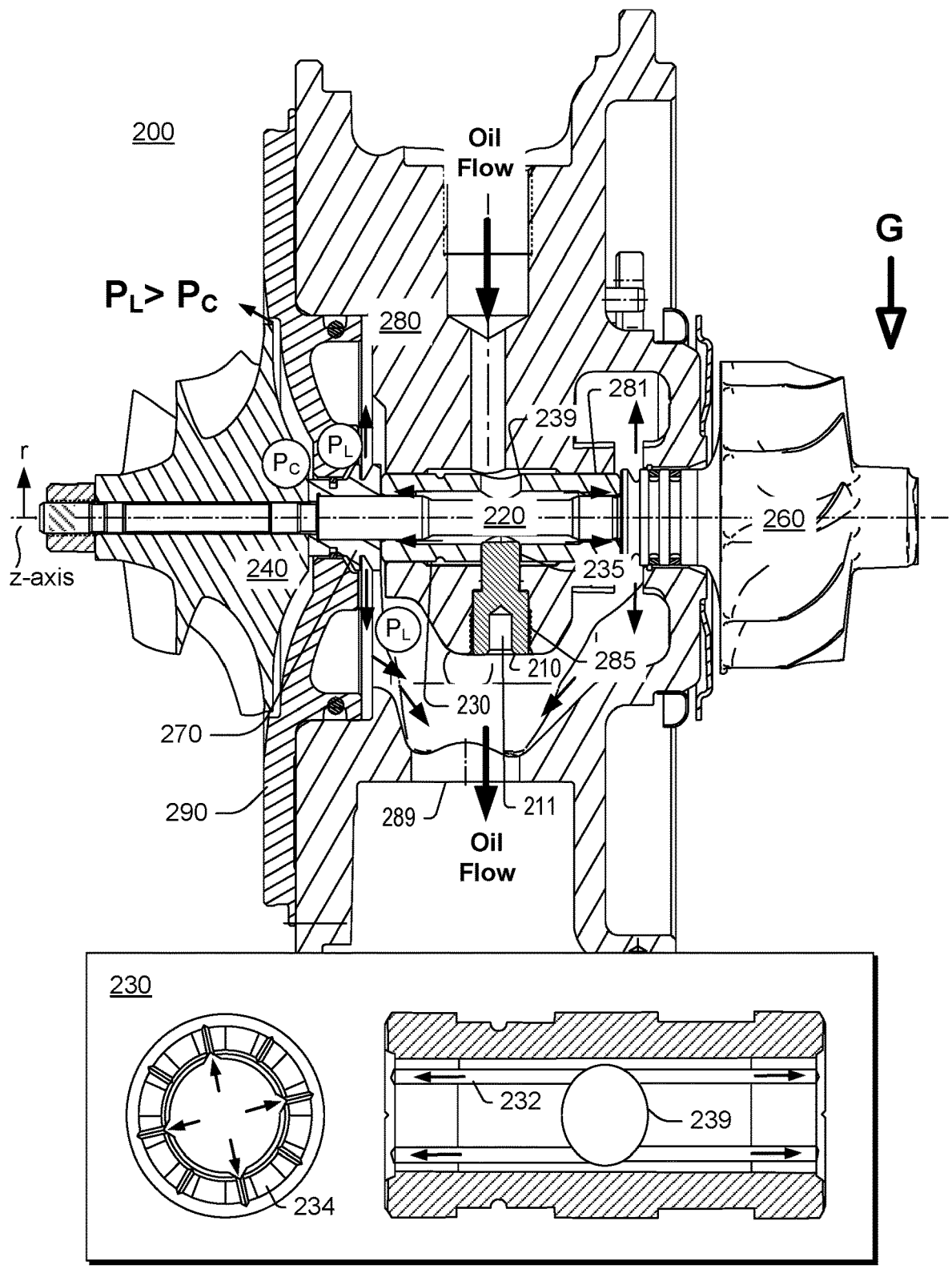
FIG. 2 is a cross-sectional view of an example of a turbocharger assembly and an end view and a cross-section view of an example of a journal bearing.

FIG. 2 shows an example of a turbocharger assembly 200 that includes a shaft 220 supported by a journal bearing 230 disposed in a center housing 280 between a compressor wheel 240 and a turbine wheel 260; noting that a thrust spacer 270 is shown as being positioned between the compressor wheel 240 and a shoulder of the shaft 220 with respect to a bore of a backplate 290. As shown in FIG. 2, the shoulder is formed by a step in diameter of the shaft 220 from a smaller diameter to a larger diameter, forming an annular axial face (e.g., a compressor side face). In the example of FIG. 2, the thrust spacer 270 abuts the axial face of the shaft 220 on one side and abuts an annular axial face of the compressor wheel 240 on an opposing side.

The journal bearing 230 is located at least partially in a through bore of the center housing 280 via a locating pin 210. In the example of FIG. 2, the locating pin 210 may be secured by being interference fit into a socket 285 of the housing 280 and may be received by an aperture 235 of the journal bearing 230 to thereby locate the journal bearing 230 in the through bore of the center housing 280.

As an example, the socket 285 of the center housing 280 can include threads such that the center housing 280 may optionally receive a locating pin with threads or, alternatively, as shown in FIG. 2, receive a locating pin with an axial length that has a maximum outer diameter that is less than that of an inner diameter of the threads such that the locating pin can bypass the threads. Where a locating pin is interference fit, it may optionally be positioned with translational movement along an axis of the locating pin, for example, without rotation about the axis. As an example, where a locating pin is interference fit, it may optionally be positioned with translational movement along an axis of the locating pin and with rotational movement about the axis of the locating pin, which may be in a clockwise direction and/or a counter-clockwise direction in contrast to a threaded locating pin that is positioned via rotation in a direction that results in translational movement of the locating pin in an insertion direction along its axis for insertion into the aperture of the journal bearing 230.

As shown in the example of FIG. 2, the locating pin 210 can optionally include an end socket 211, which may be referred to as a positioning tool socket. For example, during assembly, a positioning tool can be inserted at least partially into the end socket 211 of the locating pin 210. Such a positioning tool may be utilized to apply force and optionally torque. As shown in the example of FIG. 2, the end socket 211 extends from an end of the locating pin 210 along a longitudinal axis of the locating pin 210 where the end socket 211 may be characterized by one or more radii. For example, the end socket 211 may be of a relatively constant radius over an axial length and/or of varying radii such that a particular type of positioning tool may transfer torque (e.g., consider a hexagonal cross-sectional profile of the end socket 211 to receive a positioning tool with a matching hexagonal cross-section profile). As an example, an end socket of a locating pin may be internally threaded. In such an example, a tool may include matching threads such that the tool can be threadably engaged with the locating pin, which may help to avoid misplacement, falling, etc. of the locating pin during an assembly process. As an example, where a tool includes a portion that can be inserted into an end socket of a locating pin, the fit between the tool and the end socket may be an interference fit such that an amount of force is required to engage the tool and the end socket where the amount of force is less than an interference fit force (e.g., static force) that operatively couples the locating pin in a socket of a center housing. In such an approach, the engagement force between the tool and the end socket may help to avoid misplacement, falling, etc. of the locating pin during an assembly process.

As to size of a locating pin, it may be of a length that is less than approximately 10 mm and it may be of a maximum diameter that is less than approximately 5 mm. As such, it may be difficult to handle via a human hand as fingers may, by themselves, make it difficult to maneuver (e.g., rotate end over end, rotate axially, etc.).

As shown in the example of FIG. 2, the locating pin 210 is disposed within a cavity of the center housing 280, which has an opening 289, which may be referred to as a lubricant drain opening. As shown in the example of FIG. 2, a line of sight can exist between the opening 289 and the socket 285. As an example, a positioning tool for the locating pin 210 may be inserted into the center housing 280 via the opening 289. Such a tool may be received via the end socket 211 for purposes of positioning the locating pin 210.

As an example, a radius of the end socket 211 as measured from a central longitudinal axis may be larger than a radius of a pin portion of the locating pin 210 or, for example, a radius of the end socket 211 may be equal to a radius of a pin portion of the locating pin 210 or, for example, a radius of the end socket 211 may be smaller than a radius of a pin portion of the locating pin 210. As the locating pin 210 is stepped, with its pin portion being of a smaller maximum radius than a seating portion, the seating portion can be of a greater volume than the pin portion of the locating pin 210 such that the seating portion of the locating pin 210 can be formed (e.g., machined, etc.) to include the end socket 211 with a desired maximum radius, which may be larger than that of a locating pin that has a maximum radius along its axial length that is an interference fit radius (e.g., consider a cylindrical locating pin).

As shown in FIG. 2, the socket 285 of the center housing 280 is stepped and the locating pin 210 is stepped. In such an approach, an axial face of the socket 285 and an axial face of the locating pin 210 can contact and limit the insertion depth of the locating pin 210 with respect to the socket 285. As an example, a diameter of a pin portion of the locating pin 210 and a diameter of a seating portion of the locating pin 210 can approximate an inner diameter and an outer diameter, respectively, of an annular axial face that can be used to axially locate the locating pin 210 in the socket 285.

As an example, the locating pin 210 may axially and azimuthally locate the journal bearing 230 in a through bore 281 of the center housing 280. As shown in the example of FIG. 2, opposite the aperture 235 of the journal bearing 230, the journal bearing 230 includes a lubricant opening 239 for flow of lubricant to inner journal surfaces of the journal bearing 230 that support the shaft 220. Lubricant may flow to the through bore 281 of the center housing 280, through the lubricant opening 239 and to the inner journal surfaces to form lubricant films that lubricate the shaft 220 within the journal bearing 230. Lubricant may also flow to clearances between walls of the through bore 281 of the center housing 280 and outer surfaces of the journal bearing 230. As an example, one or more lubricant films may form about outer surfaces of the journal bearing 230.

As an example, the journal bearing 230 may move radially within the through bore of the center housing 280, for example, the journal bearing 230 may move up and down radially with respect to an axis of the locating pin 210 while being limited axially and azimuthally by the locating pin 210 (e.g., the journal bearing 230 may be a semi-floating journal bearing).

FIG. 2 also shows an end view and a cross-sectional view of the journal bearing 230. In the example of FIG. 2, the journal bearing 230 includes axially oriented channels 232 that extend across inner journal surfaces for flow of lubricant. The channels 232 extend to the end of the journal bearing 230 where various features provide for distribution of lubricant across thrust pads (e.g., thrust surfaces) 234 of the journal bearing 230. The thrust pads 234 of the journal bearing 230 and lubricant may help to manage thrust forces experienced during operation.

In the example of FIG. 2, the thrust surfaces forming the thrust pads 234 include radial grooves to improve thrust capacity while also enhancing contamination control. As an example, eight radial grooves at 45° spacing can be employed with four of the grooves in alignment with the axial grooves in the bearing bore. As an example, each of the axial grooves 232 may have a V-shape (e.g., a 90° V-shape). As shown, a relief on the inner periphery of each thrust surface may act to enhance lubricant delivery and distribution.

The thrust collar 270 can include an integral slinger or a separate slinger component may be provided. A slinger acts to direct lubricant outwardly away from the shaft, as indicated by arrows. A slinger can include one or more passages that extend from an inner radius to an outer radius to direct lubricant outwardly as the slinger rotates.

In the example of FIG. 2, the thrust collar 270 is shown as including an integral slinger and an annular face that faces the end of the journal bearing 230. As an example, lubricant may, under pressure of a lubricant feed system (e.g., an engine lubricant pump), be supplied to the thrust pads 234 of the journal bearing 230 to form a lubricant film between the annular face of the thrust collar 270 and the thrust pads 234 of the journal bearing 230. As the thrust collar 270 can rotate, lubricant that forms the lubricant film may be slung radially outwardly as well (e.g., additionally to lubricant in the passages of the slinger). Whether lubricant is slung from passages of the slinger or from the lubricant film, the lubricant may drain under the influence of gravity (see arrow labeled "G") downwardly towards a lubricant drainage cavity of the center housing 280.

FIG. 2 also shows small arrows near the compressor wheel 240 to indicate where lubricant may escape and possibly be carried with gas compressed by rotation of the compressor wheel 240 (e.g., in a compressor housing). A slinger may help to reduce escape of lubricant via a compressor. As shown in the example of FIG. 2, the backplate 290 has a contour such that slung lubricant can collect and flow along a larger radius located a distance away from the shaft 220. A slope at the bottom side of the contour of the backplate 290 may direct flow of lubricant to the lubricant drainage cavity of the center housing 280 (see, e.g., arrows).

As to pressures, the region formed between the backplate 290 and the center housing 280 can have a pressure that is approximately the same as that of the lubricant drainage cavity of the center housing (see, e.g., $P_L$). Thus, in such a scenario, the flow of lubricant to the lubricant drain of the center housing 280 occurs mainly under the influence of gravity. Such an approach may be considered an expansion approach, which acts to minimize the pressure of the lubricant exiting a clearance between the shaft 220 and the journal bearing 230 and, hence, minimize the driving force (e.g., pressure differential) for escape of lubricant to a space between the backplate 290 and the compressor wheel 240 (see, e.g., $P_C$). As indicated in the example of FIG. 2, by having an enlarged region (e.g., large volume) between the backplate 290 and the center housing 280, a large pressure drop may be achieved for lubricant exiting a clearance between the shaft 220 and the journal bearing 230 (e.g., considering that the lubricant is fed to the center housing 280 via a pump such as an engine oil pump). In the example of FIG. 2, small arrows indicate a flow direction for lubricant escape to the space via an interface formed between the thrust collar 270 and the backplate 290, noting that one or more seal rings (e.g., O-rings) may be positioned about the thrust collar 270 to resist such flow.

The turbocharger assembly 200 of FIG. 2 is oil cooled as well as air cooled, for example, by being in an environment with ambient air or vehicle engine compartment air. A turbocharger may be cooled via one or more mechanisms. For example, a turbocharger may be cooled via air, water, oil or other fluid. As to lubricant cooling (e.g., oil, whether natural, synthetic, etc.), some tradeoffs exists. For example, if a carbonaceous lubricant reaches too high of a temperature for too long of a time (e.g., consider a time-temperature dependence), carbonization (e.g., also known as coke formation or "coking"), may occur. Coking can exasperate heat generation and heat retention by any of a variety of mechanisms and, over time, coke deposits can shorten the lifetime of a lubricated bearing system. As an example, coke deposits may cause a reduction in heat transfer and an increase heat generation, which may lead to failure of the bearing system.

To overcome coking, a turbocharger may be configured to improve lubricant flow. For example, a pump may pressurize lubricant to increase flow rates to reduce residence time of lubricant in high temperature regions. However, an increase in lubricant pressure can exasperate various types of lubricant leakage issues. For example, an increase in lubricant pressure of a bearing system can result in leakage of lubricant to an exhaust turbine, to an air compressor or both. Escape via an exhaust turbine can lead to observable levels of smoke while escape via an air compressor can lead to lubricant entering an intercooler, combustion chambers (e.g., combustion cylinders), etc.

To reduce risk of coking and/or other lubricant issues, a system may employ water cooling where "water" is engine coolant that is circulated to a turbocharger, which may include a cast center housing with water passages and/or a water cooling jacket with water passages that is fit to or otherwise operatively coupled to an oil cooled turbocharger core (e.g., an oil cooled center housing).

As an example, an interference fit may be achieved via application of force and/or via thermal control. A force fit may be referred to as a press fit that is achieved via a force applicator that can press a stepped locating pin into a stepped locating pin socket. As an example, a force applicator may be a hydraulic press or other type of press that includes a portion that may contact (directly and/or indirectly) a stepped locating pin to apply force to the stepped locating pin. Various examples are given in Tables 2 and 3 (further below) as to some examples of forces.

As an example, a stepped locating pin and/or a stepped locating pin socket can include chamfers (bevels) that can forms a guide(s) for positioning and/or interference fitting, which may help to distribute force(s) more evenly around a circumference of an opening, which may allow compression to more occur gradually such that a pressing operation may be smoother, more easily controlled, etc.

As to thermal control, various materials expand when heated and shrink when cooled. As such, a stepped locating pin may be cooled (e.g., and/or a housing may be heated depending on material, stress, etc.). As an example, a thermal control process may include heating and/or cooling of one or more components where at ambient temperature (e.g., and at operational temperatures of a turbocharger) compression results from thermal equilibrium of a stepped locating pin in a stepped locating pin socket. Such a process may be a shrink-fitting processor. As an example, a stepped locating pin may be cooled using one or more agents (e.g., carbon dioxide at approximately −78.5 degrees C., liquid nitrogen at approximately −196 degrees C., etc.). In a sub-ambient temperature state (e.g., below approximately 20 degrees C.), where a housing with a stepped locating pin socket may be at least at an ambient temperature, a cooled stepped locating pin may be positioned in the stepped locating pin socket such that contact surfaces of the cooled stepped locating pin and the stepped locating pin socket contact each other to limit axial movement. In such a state, the pin and the housing may be held in such a position until the temperature of the stepped locating pin rises such that the stepped locating pin expands in diameter to create an interference fit.

As an example, a thermal process that involves cooling a stepped locating pin may be more effective as to longevity of a turbocharger as heating for thermal expansion (e.g., above ambient temperature) may introduce one or more types of changes to material properties (e.g., tempering, etc.), may introduce undesirable stresses, etc.

As an example, a stepped locating pin that is interference fit via a thermal process may be scar-less in that a contact surface of the stepped locating pin does not translate or rotate against a contact surface of a stepped locating pin socket in a manner that would scar the contact surface of the stepped locating pin. In such an approach, one or more surfaces of a stepped locating pin may be without indentations, grooves, scratches, etc., which may mean that debris is avoided, that a bearing with an aperture is located by a smoother portion of a stepped locating pin in comparison to a scarred portion (e.g., consider a pin portion of a stepped locating pin that may contact a surface of a housing in a force fit process before being fully extended into a through bore of the housing such that at least a portion of the pin portion is scarred), etc.

Figure 3:
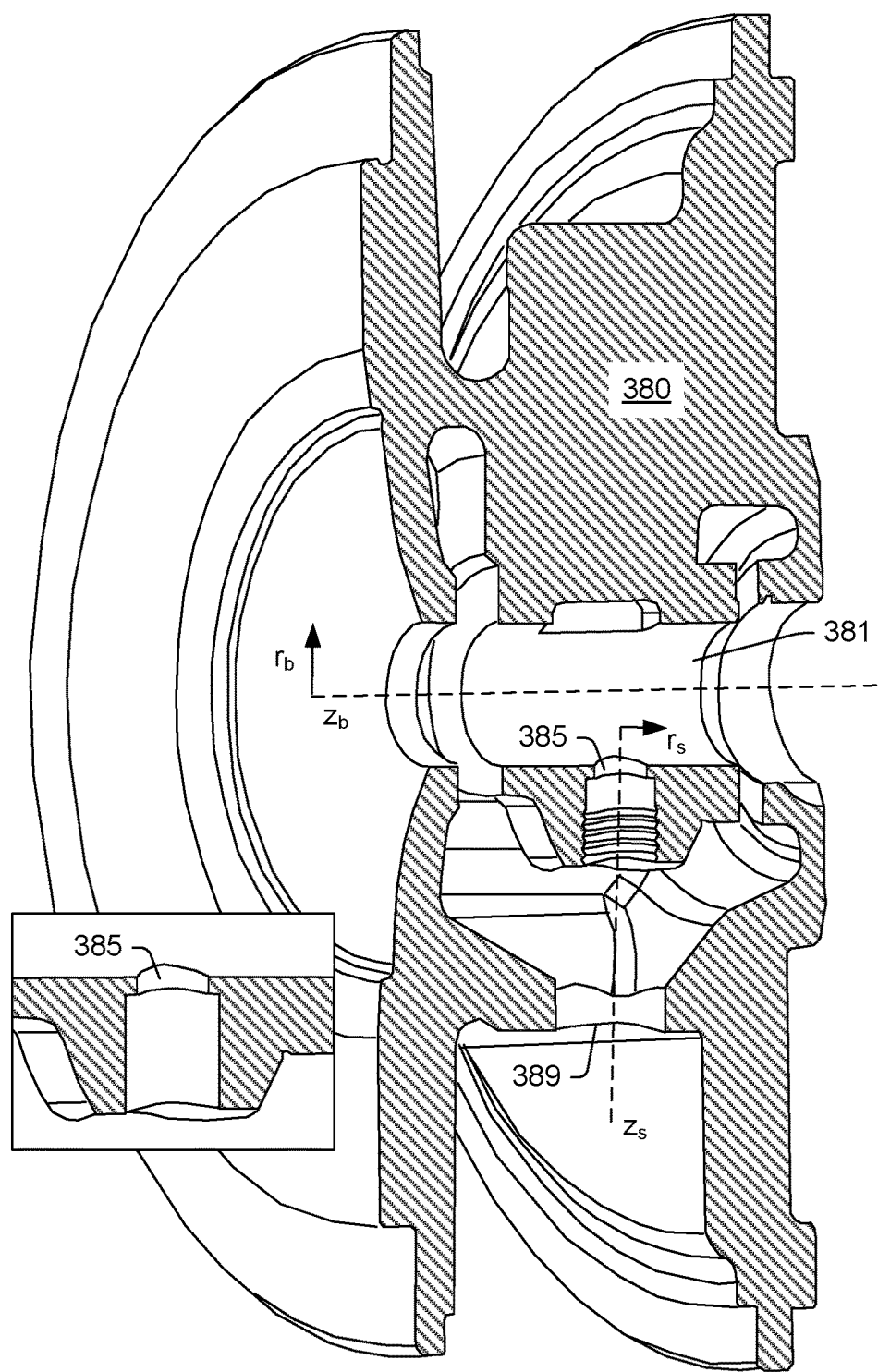
FIG. 3 is a cut-away view of an example of a center housing of a turbocharger.

FIG. 3 shows an example of a center housing 380 in a cutaway view where the center housing 380 includes a through bore 381, a locating pin socket 385 and a lubricant drain 389. During assembly of a turbocharger, a journal bearing may be positioned in the through bore 381 and axially and azimuthally located via a locating pin received in the locating pin socket 385 where, for example, the locating pin may be interference fit in the locating pin socket 385.

As shown in FIG. 3, the locating pin socket 385 can include threads or be threadless (see inset view). As such, a locating pin socket may be a threaded locating pin socket or may be a threadless locating pin socket. As an example, a threadless locating pin socket may reduce manufacturing actions and may reduce cost.

FIG. 3 shows an axis $z_b$ of the through bore 381 and a radial direction thereto $r_b$ as well as an axis $z_s$ of the locating pin socket 385 and a radial direction thereto $r_s$. As shown in FIG. 3, the axis $z_b$ and the axis $z_s$ may intersect, for example, the locating pin socket 385 can be a cross-bore with respect to the through bore 381. In the example of FIG. 3, the axis $z_s$ extends through the lubricant drain 389 (e.g., a line of sight exists between the lubricant drain 389 and the locating pin socket 385).

A locating pin can be inserted inside a center housing to locate and establish contact with a journal bearing for semi-floating bearing function. Such a locating pin can be oriented prior to insertion and then, for example, press fit into a socket in the center housing. In such an example, the locating pin and the socket can be stepped such that contact occurs to limit the axial depth of the locating pin in the socket. Such an approach may simplify assembly and machining by reducing a number of steps/process required for assembly and manufacturing. For example, an assembly process may be reduced as to number of actions, an assembly process may be a threadless assembly process as to coupling between a center housing and locating pin, an assembly process may be standardized for different types of center housing (e.g., sizes, threaded, threadless, etc.), etc. As an example, a turbocharger can include a wastegate (WG) and/or a variable nozzle turbine (VNT). As an example, a WG and/or a VNT may be selected based on a type of vehicle, a type of engine, etc. As an example, a locating pin may be designed for use with a plurality of different types of center housings and/or turbochargers.

As an example, a locating pin may have a clearance fit with a journal bearing and an interference fit with a socket of a center housing. As an example, a locating pin can include an outer surface that is symmetric about a central axis of the locating pin.

As an example, a locating pin may be made of a low alloy steel. As an example, a center housing may be made of cast iron (e.g., grey cast iron). As an example, a locating pin can be a machined component (e.g., formed from a stock cylinder of low alloy steel, etc.). As an example, a locating pin socket of a center housing can be formed via machining a cast center housing.

As an example, as to interference fit of a locating pin, it may include a pin portion and a seating portion where the seating portion provides for an interference fit. For example, a seating portion diameter can be approximately 25 µm to approximately 45 µm greater than a maximum diameter of a locating pin socket seating portion. As an example, one or more interference fit dimensions may be dependent on size of a semi-floating bearing and may, for example, be dependent on one or more load requirements.

As to thermal behavior, a center housing may exhibit the following properties: 11.24 µm/m ° C. (at 20 degrees C.) and 12.61 µm/m ° C. (at 300 degrees C.).

Figure 4:
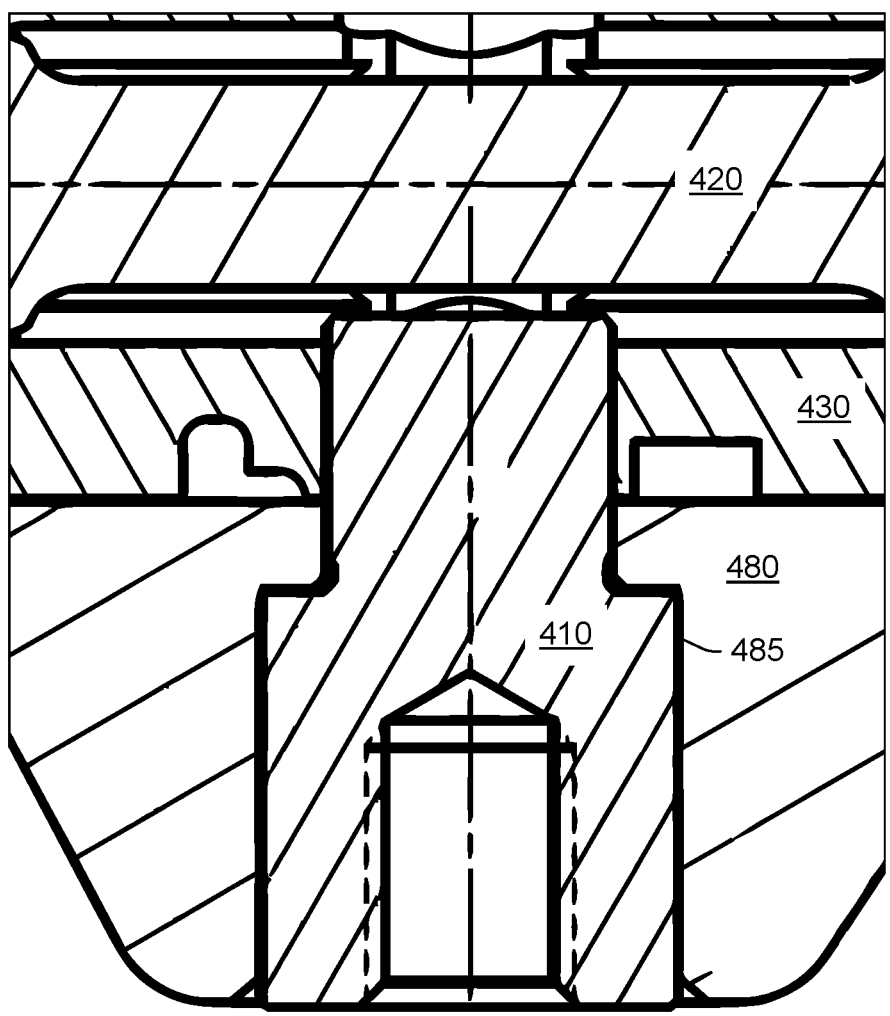
FIG. 4 is a cross-sectional view of a portion of an example of an assembly.

FIG. 4 shows an example of a portion of an assembly 400 that includes a stepped locating pin 410, a shaft 420, a bearing 430 and a housing 480 that includes a stepped locating pin socket 485. As shown, the stepped locating pin socket 485 is threadless.

Figure 5:
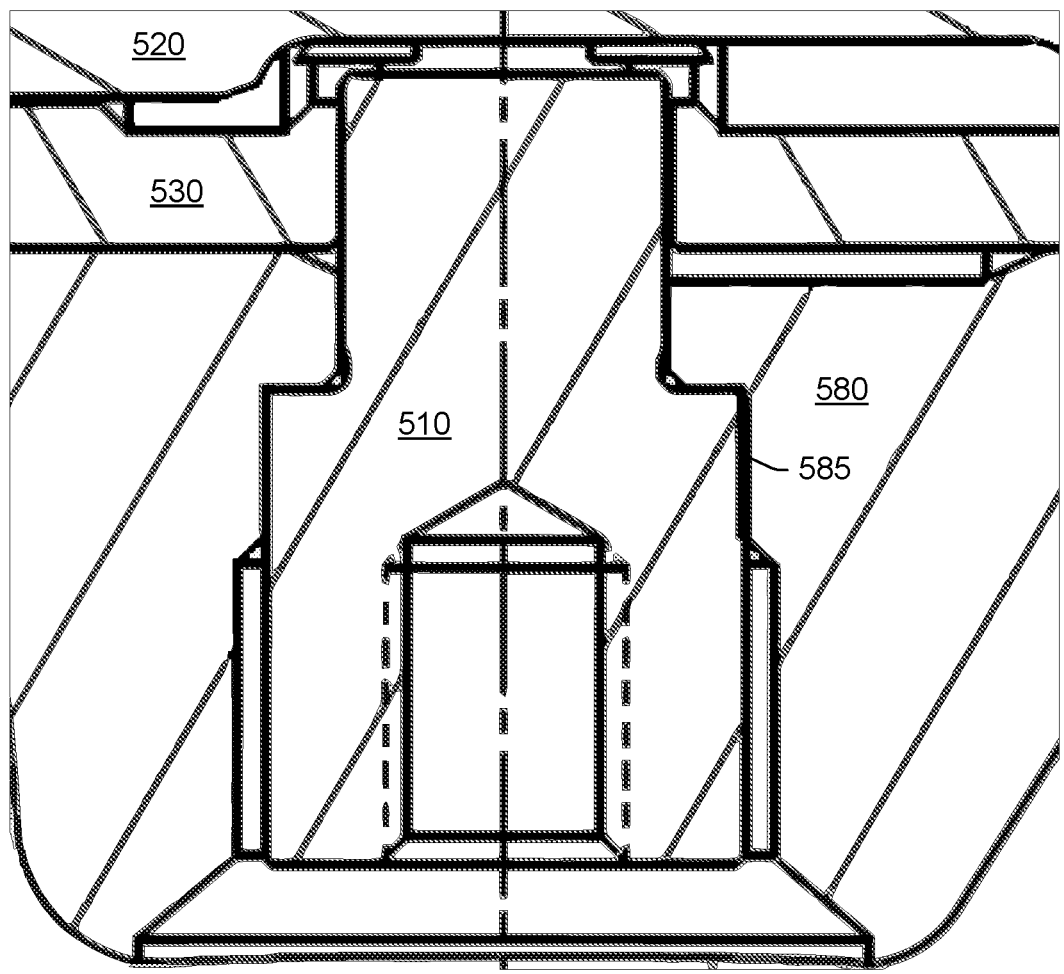
FIG. 5 is a cross-sectional view of a portion of an example of an assembly.

FIG. 5 shows an example of a portion of an assembly 500 that includes a stepped locating pin 510, a shaft 520, a bearing 530 and a housing 580 that includes a stepped locating pin socket 585. As shown, the stepped locating pin socket 585 includes threads.

Figure 6:
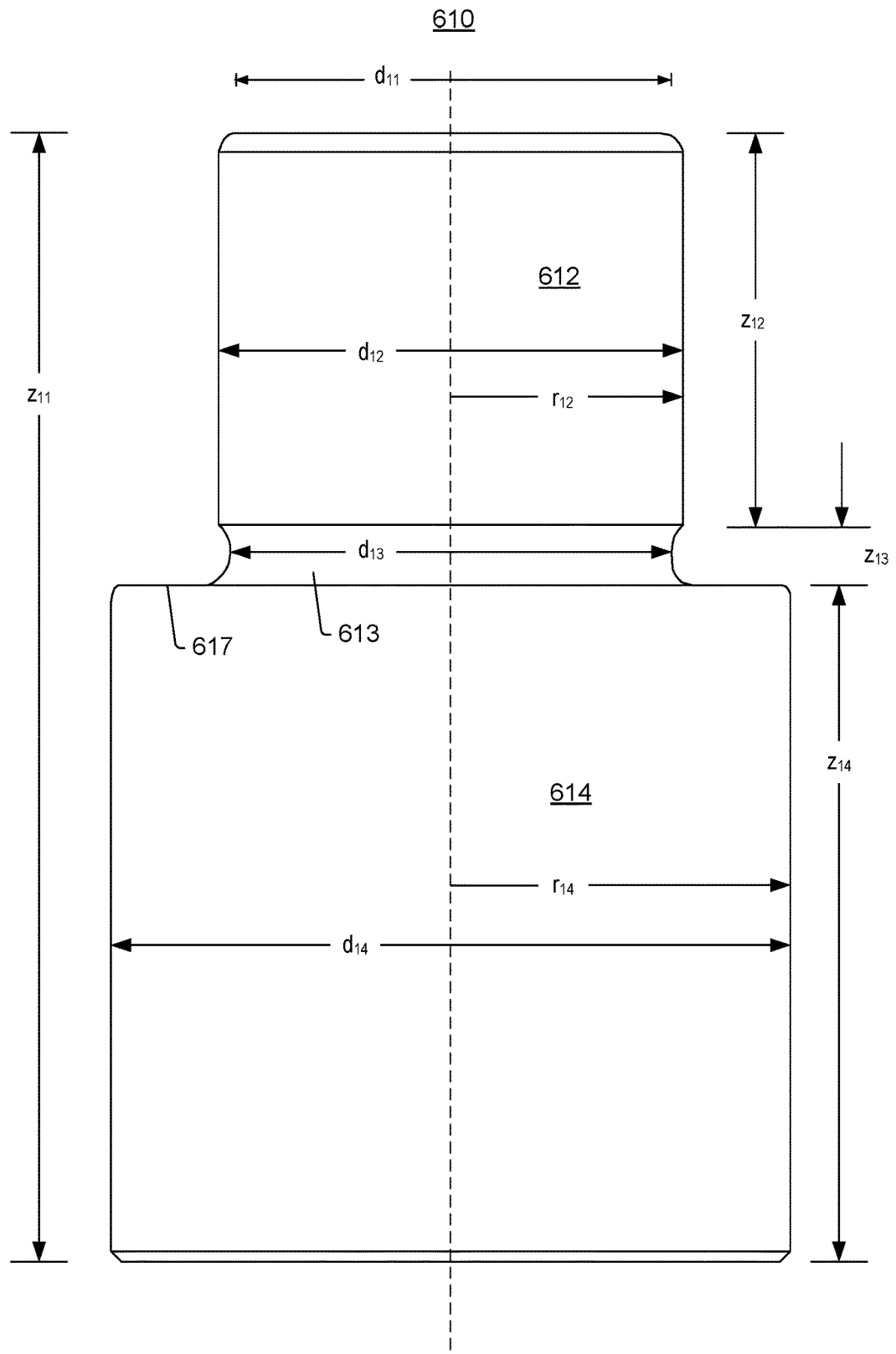
FIG. 6 is a side view of an example of a stepped locating pin.

FIG. 6 shows an example of a locating pin 610 along with various dimensions including diameters $d_{11}$, $d_{12}$, $d_{13}$, and $d_{14}$ and axial lengths $z_{11}$, $z_{12}$, $z_{13}$, and $z_{14}$. The locating pin 610 includes a pin portion 612 with an axial length $z_{12}$ and a diameter $d_{12}$ and a seating portion 614 with an axial length $z_{14}$ and a diameter $d_{14}$. As shown, the locating pin 610 can include a transition region 613 with a minimum diameter $d_{13}$ and an axial length $z_{13}$. Such a region may provide for stress reduction and/or proper seating between an axial face 617 and an axial face of a locating pin socket of a center housing. As shown, the axial face 617 may be annular with an inner diameter of approximately $d_{12}$ and an outer diameter of approximately $d_{14}$. As an example, the axial face 617 can be referred to as a stop surface where it may contact a stop surface of a locating pin socket of a housing to axially locate the locating pin 610 in the locating pin socket of the housing. In such an example, a longitudinal axis of the locating pin 610 can be perpendicular to a plane of the axial face 617 (e.g., a stop surface of the locating pin 610) and a longitudinal axis of the locating pin socket of the housing can be perpendicular to a plane of its stop surface such that upon interference fitting of the locating pin 610 in the locating pin socket the longitudinal axes align and an interface is formed (e.g., a contact interface) that is in a plane where contact may be from an inner radius to an outer radius at a constant z-value along the aligned longitudinal axes. As an example, the locating pin 610 can be referred to as a stepped locating pin, which can be configured for being secured in a stepped locating pin socket of a housing. As an example, a step may be a 90 degree step.

Figure 7A:
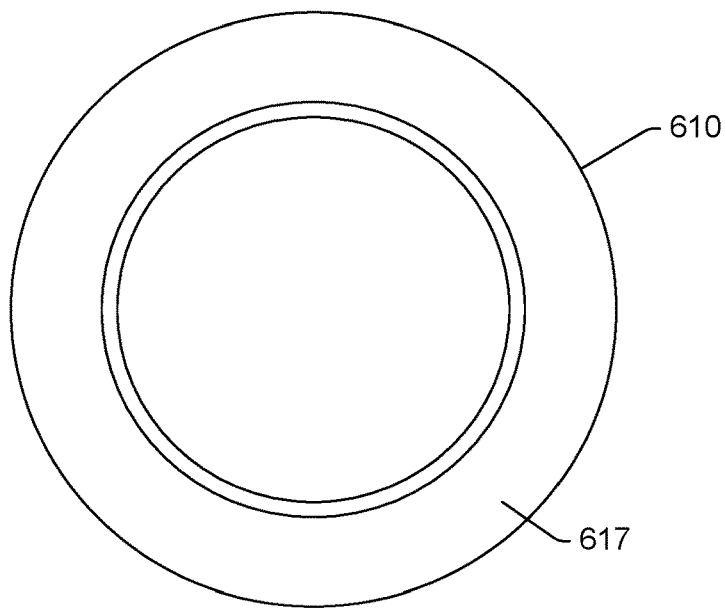
FIGS. 7A and 7B are end view of the stepped locating pin of FIG. 6.
Figure 7B:
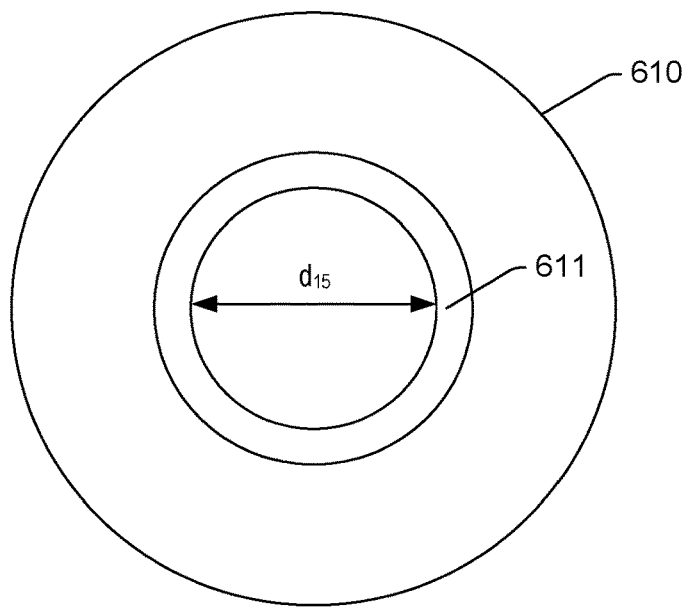

FIGS. 7A and 7B show plan views from opposing ends of the locating pin 610 of FIG. 6. In the plan view of FIG. 7A, the axial face 617 is illustrated where an end of the pin portion 612 can include an annular chamfer. In the plan view of FIG. 7B, an end socket 611 of the seating portion 614 is illustrated, which includes a diameter $d_{15}$ where an edge of the end socket 611 may include an annular chamfer. As an example, the end socket 611 may be of an M configuration (e.g., M4, etc.).

Figure 8:
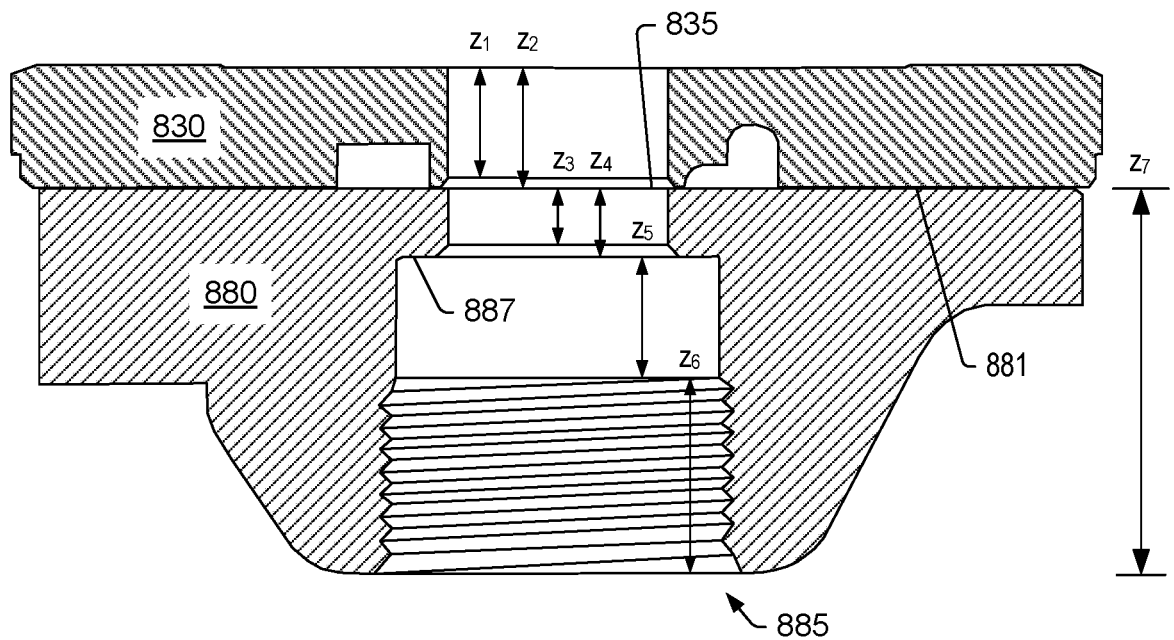
FIG. 8 is a cross-sectional view of a portion of an example of an assembly.
Figure 8:
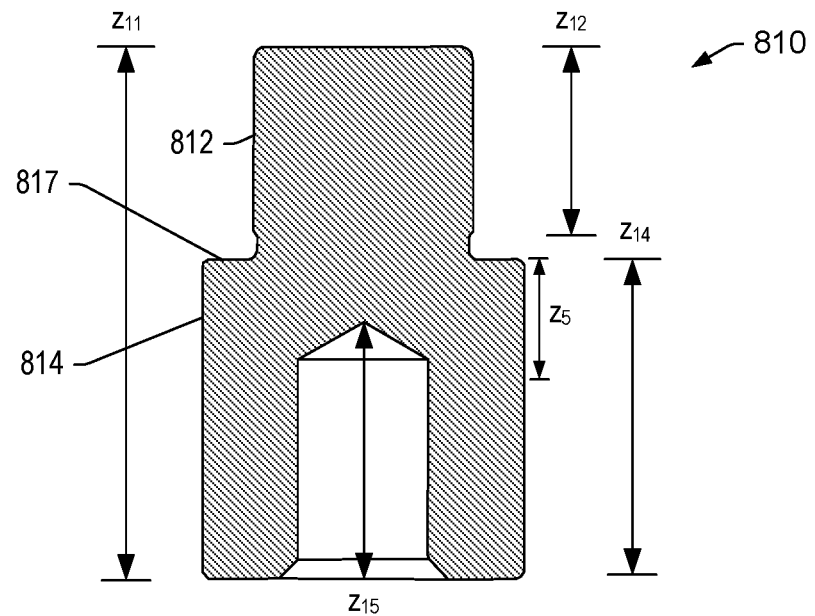

FIG. 8 shows an assembly 800 that includes a stepped locating pin 810 that includes a pin portion 812, a seating potion 814 and a stop surface 817 (e.g., an annular axial face); a bearing 830 that includes an opening 835; and a housing 880 that includes a through bore 881 (e.g., defined by an inner surface of the housing 880) and a locating pin socket 885 that includes a stop surface 887 (e.g., an axial face that can be an annular surface defined by a smaller inner diameter and a larger outer diameter of the locating pin socket 885). Various dimensions are shown with respect to the bearing 830 and the housing 880, including axial dimensions $z_1$, $z_2$, $z_3$, $z_4$, $z_5$, $z_6$, and $z_7$. In the example of FIG. 8, the locating pin socket 885 includes threads. In the example of FIG. 8, the axial dimensions of the stepped locating pin 810 correspond to those of FIG. 6.

In the example of FIG. 8, the axial dimension $z_5$ is shown with respect to the locating pin socket 885 and the stepped locating pin 810. An interference fit may be of an axial length that is approximately equal to the axial dimension $z_5$ where respective substantially cylindrical contact surfaces of the locating pin socket 885 (e.g., a stepped locating pin socket) and of the stepped locating pin 810 contact. As mentioned, depending on the process or processes utilized to achieve the interference fit, such surfaces may be scar-less or scarred. For example, a thermal process may be utilized that reduces scarring or that does not introduce scarring of one or more contact surfaces.

As an example, a pin portion of a stepped locating pin may be of a diameter that is less than a diameter of a pin portion of a stepped locating pin socket such that the pin portion of the stepped locating pin can be translated into the pin portion of the stepped locating pin socket without scarring. In such an example, the pin portion of the stepped locating pin may be scar-less, which may provide a smooth surface for interaction(s) with a surface of a bearing that defines an opening that receives at least a portion of the pin portion of the stepped locating pin.

In the example of FIG. 8, parameters can include a stepped locating pin length (PL or $z_{12}+z_{13}$), an interference fit length (PPFL, see, e.g., $z_5$, which may be approximately an interference fit length), a center housing axial step length (X) and a bearing detection axial dimension of 1, which may be unitless (e.g., normalized). As an example, the bearing detection axial dimension may be of the order of approximately one millimeter (e.g., approximately 1 mm).

Given the aforementioned parameters, consider the following equations:

$PL=PPFL+X+1$ $PPFL=PL-X-1$

As an example, consider a PPFL of approximately 2.5 mm and a bearing detection axial dimension of approximately 1 mm. In such an example, PL=2.5+X+1. In such an example, X may be approximately 2 mm to approximately 3 mm such that PL ~5.5 mm to ~6.5 mm. As an example, a PPFL may be in a range from approximately 1 mm to approximately 6 mm, in a range from approximately 1 mm to approximately 4 mm, in a range from approximately 1 mm to approximately 3 mm, in a range from approximately 1.5 mm to approximately 3 mm. In such examples, a stepped locating pin may include one or more ratios of dimensions of the stepped locating pin 810 of the example of FIG. 8.

As an example, where machining equipment for a center housing includes a tool or tools for threaded locating pin sockets, such a tool or tools may be sized according to the "M" configurations, which specify drill sizes. For example, consider a machining process for an M8×1 threaded socket that uses a 7 mm drill size. In such an example, a 7 mm diameter socket may be formed with a desired axial length where the 7 mm diameter socket may be tapped for forming threads or may be not tapped (non-tapped) such that it is threadless. Where a socket includes a 7 mm diameter portion, a stepped locating pin can include a smaller diameter portion that steps to a larger diameter portion where the larger diameter portion has a diameter that exceeds 7 mm by approximately 0.005 mm to approximately 0.1 mm (e.g., 7+ mm) for purposes of forming an interference fit upon contact of at least a portion of the 7 mm diameter portion of the socket of the housing and at least a portion of the 7+ mm diameter portion of the stepped locating pin. As an example, a diameter of a portion of a stepped locating pin can be approximately 0.015 mm to approximately 0.05 mm larger than a portion of a stepped locating pin socket or, for example, approximately 0.02 mm to approximately 0.04 mm larger than a portion of a stepped locating pin socket for purposes of forming an interference fit.

Table 1, below, shows some example dimensions for "M" configurations.

| Tap size | Major d (mm) | Major d (inch) | mm/thread | Drill size |
|---|---|---|---|---|
| M3 × 0.5 | 3 mm | 0.1181 | 0.5 | 2.5 mm |
| M3.5 × 0.6 | 3.5 mm | 0.1378 | 0.6 | 2.9 mm |
| M4 × 0.7 | 4 mm | 0.1575 | 0.7 | 3.3 mm |
| M5 × 0.8 | 5 mm | 0.1969 | 0.8 | 4.2 mm |
| M6 × 1 | 6 mm | 0.2362 | 1 | 5 mm |
| M8 × 1.25 | 8 mm | 0.315 | 1.25 | 6.8 mm |
| M8 × 1 | 8 mm | 0.315 | 1 | 7 mm |
| M10 × 1.5 | 10 mm | 0.3937 | 1.5 | 8.5 mm |
| M10 × 1.25 | 10 mm | 0.3937 | 1.25 | 8.8 mm |
| M12 × 1.75 | 12 mm | 0.4724 | 1.75 | 10.2 mm |
| M12 × 1.25 | 12 mm | 0.4724 | 1.25 | 10.8 mm |

Figure 9:
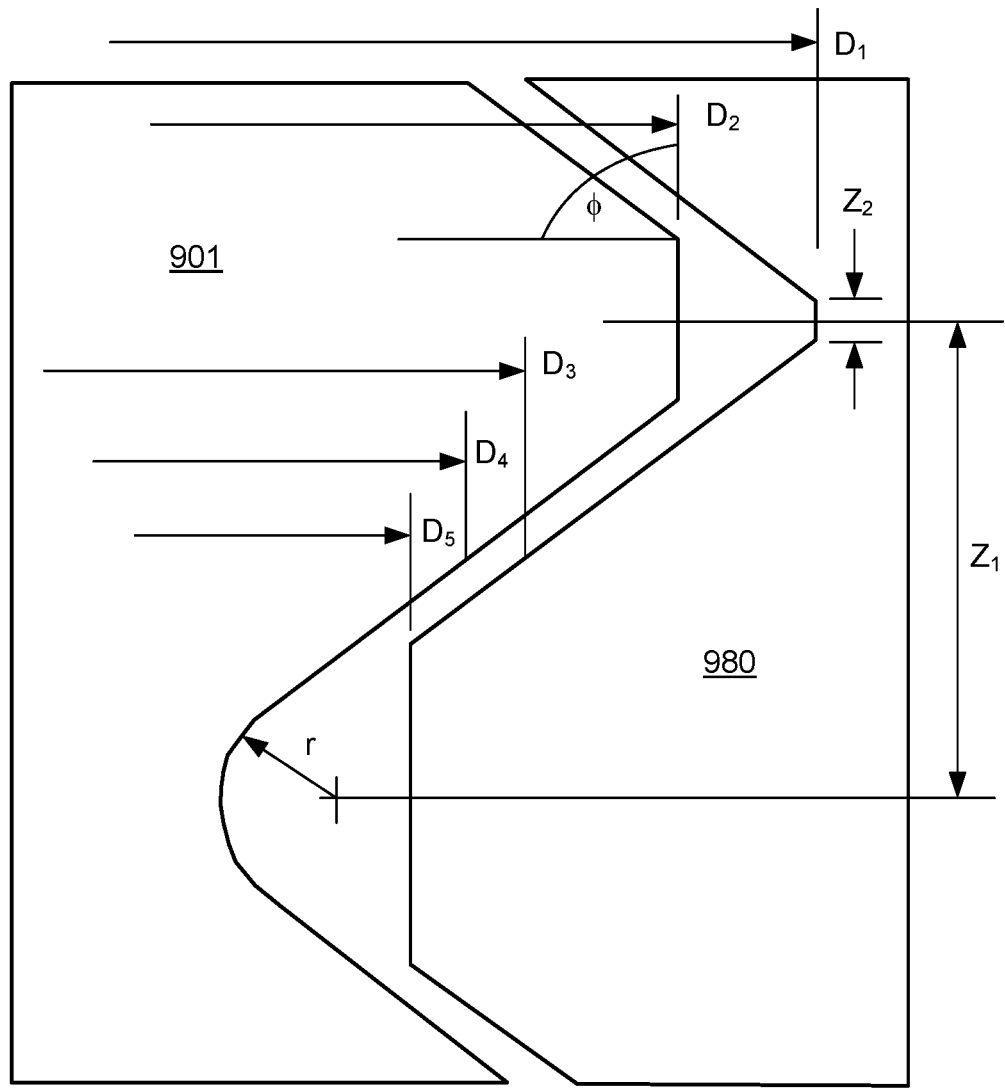
FIG. 9 is a diagram of an example of a locating pin that includes threads and an example of a locating pin socket that includes threads.

FIG. 9 shows an example of a portion of a threaded locating pin socket of a housing 980 with a portion of a threaded locating pin 901. In FIG. 9, diameters $D_1$, $D_2$, $D_3$, $D_4$ and $D_5$ correspond to a maximum box major diameter, a minimum pin major diameter, a maximum box pitch diameter, a minimum box pitch diameter and a maximum box minor diameter, respectively. Axial dimensions $Z_1$ and $Z_2$ correspond to a box distance and an axial pitch length. A radius, r, is shown as being associated with the minimum diameter of the pin. An angle, $\phi$, is shown as being associated with the threads of the pin 901. As an example, the housing 880 may include one or more features of the housing 980.

Figure 10:
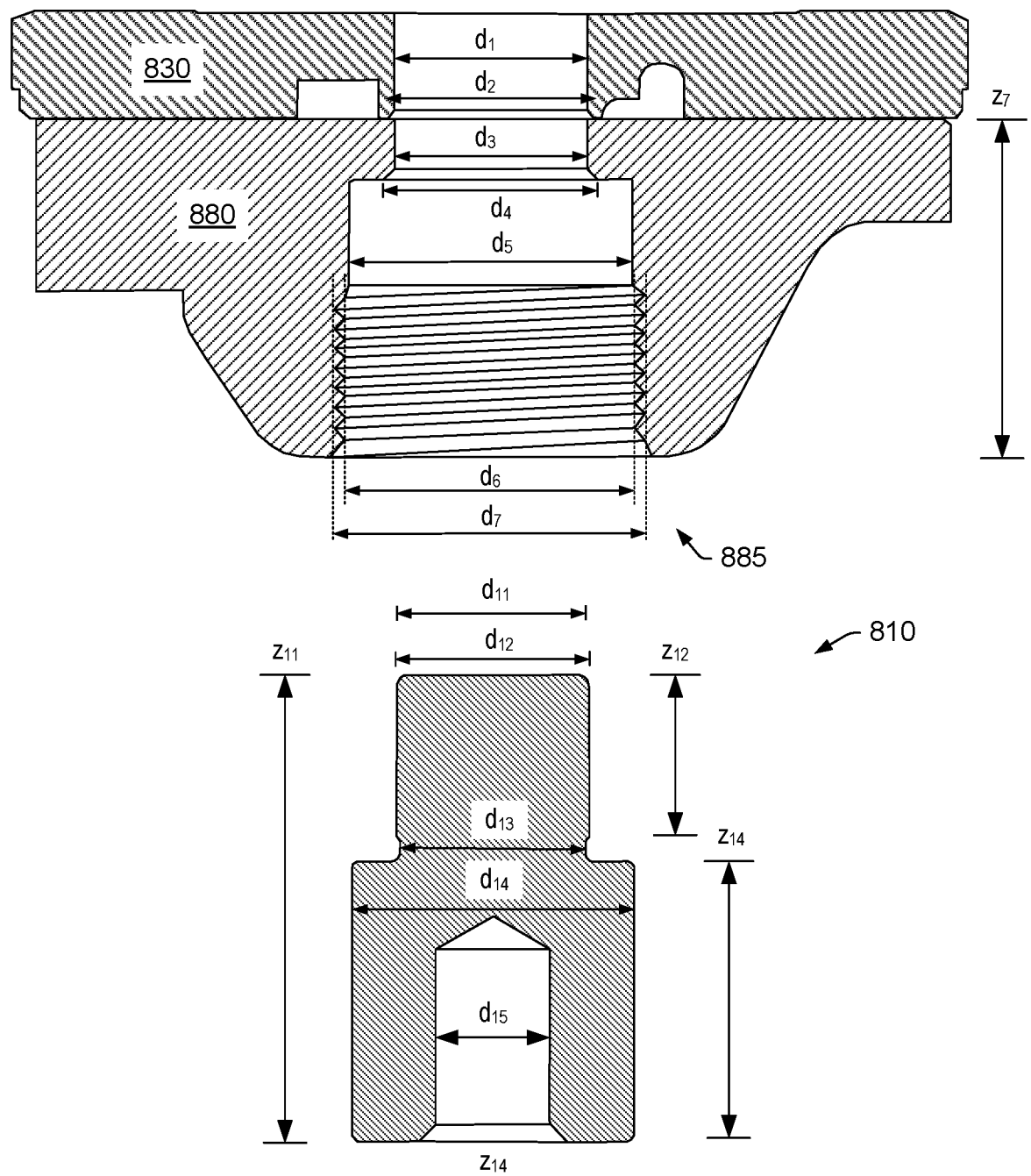
FIG. 10 is a cross-sectional view of the portion of the assembly of FIG. 8.

FIG. 10 shows the assembly 800 that includes the stepped locating pin 810, the bearing 830 and the housing 880 that includes the locating pin socket 885 along with various dimensions, including diameters $d_1$, $d_2$, $d_3$, $d_4$, $d_5$, $d_6$, $d_7$, $d_{11}$, $d_{12}$, $d_{13}$, $d_{14}$, and $d_{15}$. The dimensions may be described relative to one another, for example, $d_{14}$ is larger than $d_5$ or $d_5$ is smaller than $d_{14}$.

Figure 11:
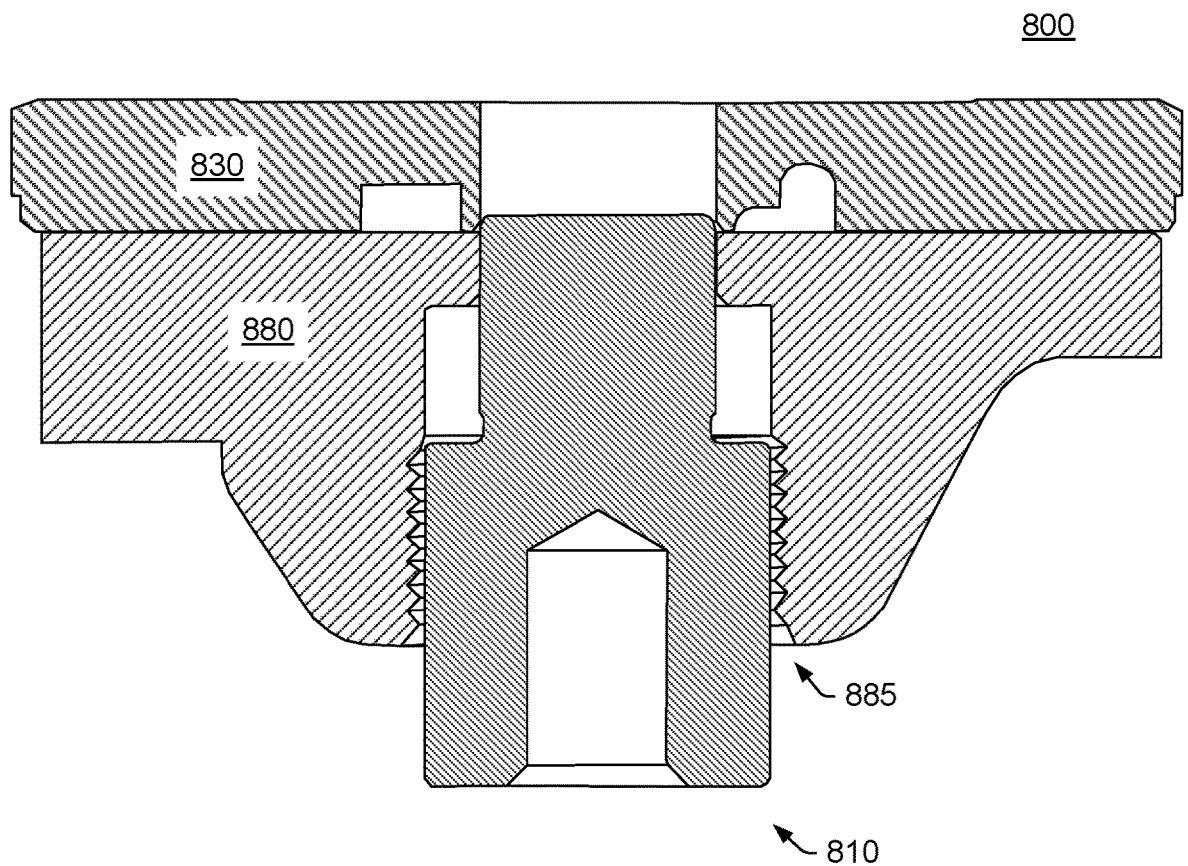
FIG. 11 is a cross-sectional view of the portion of the assembly of FIG. 8 where a locating pin is in an alignment state with respect to an opening of a bearing.

FIG. 11 shows the assembly 800 in an alignment state where a portion of the stepped locating pin 810 is aligned with the bearing 830. As shown, a portion of the stepped locating 810 is received by an opening in the bearing 830, however, interference fit portions of the locating pin socket 885 and the stepped locating pin 810 are not engaged.

Figure 12:
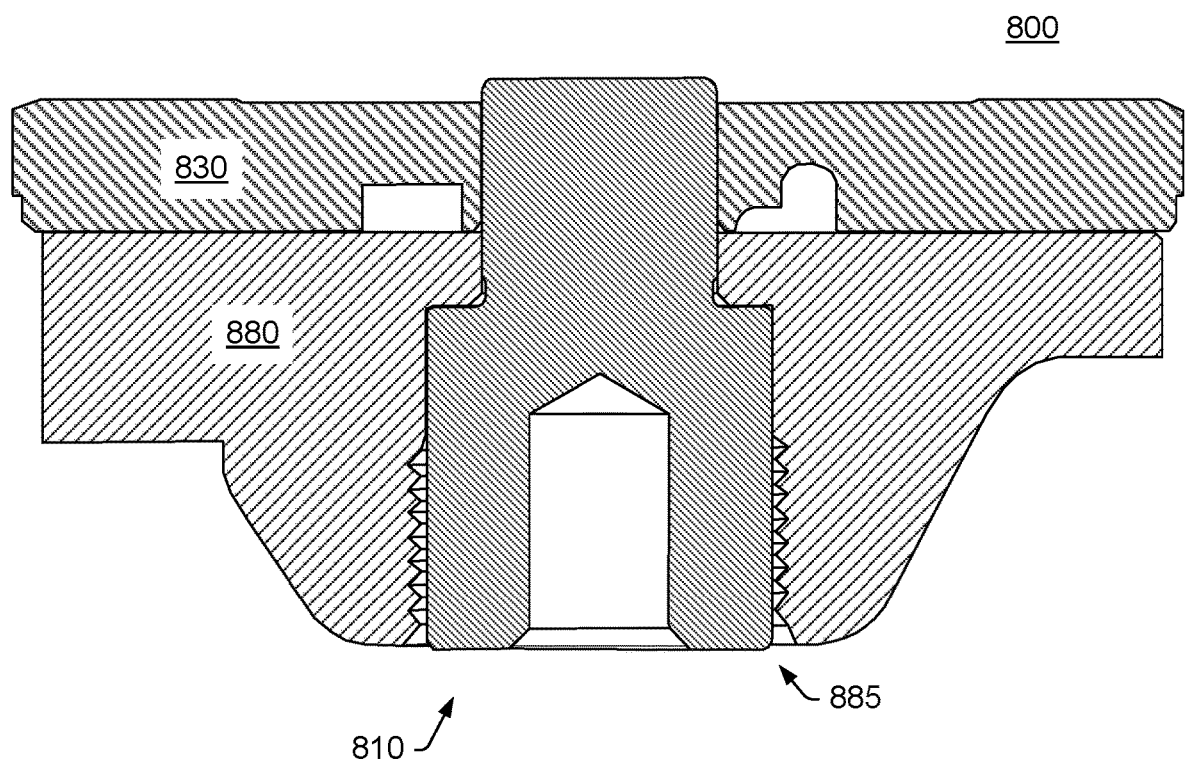
FIG. 12 is a cross-sectional view of the portion of the assembly of FIG. 8 where a locating pin is in an interference fit state with respect to an opening of a bearing.

FIG. 12 shows the assembly 800 in an interference fit state where a portion of the stepped locating pin 810 is aligned with the bearing 830 and where a portion of the stepped locating pin 810 is interference fit in the locating pin socket 885 such that the stepped locating pin 810 and the locating pin socket 885 are engaged for purposes of locating the bearing 830 in the housing 880.

Figure 13:
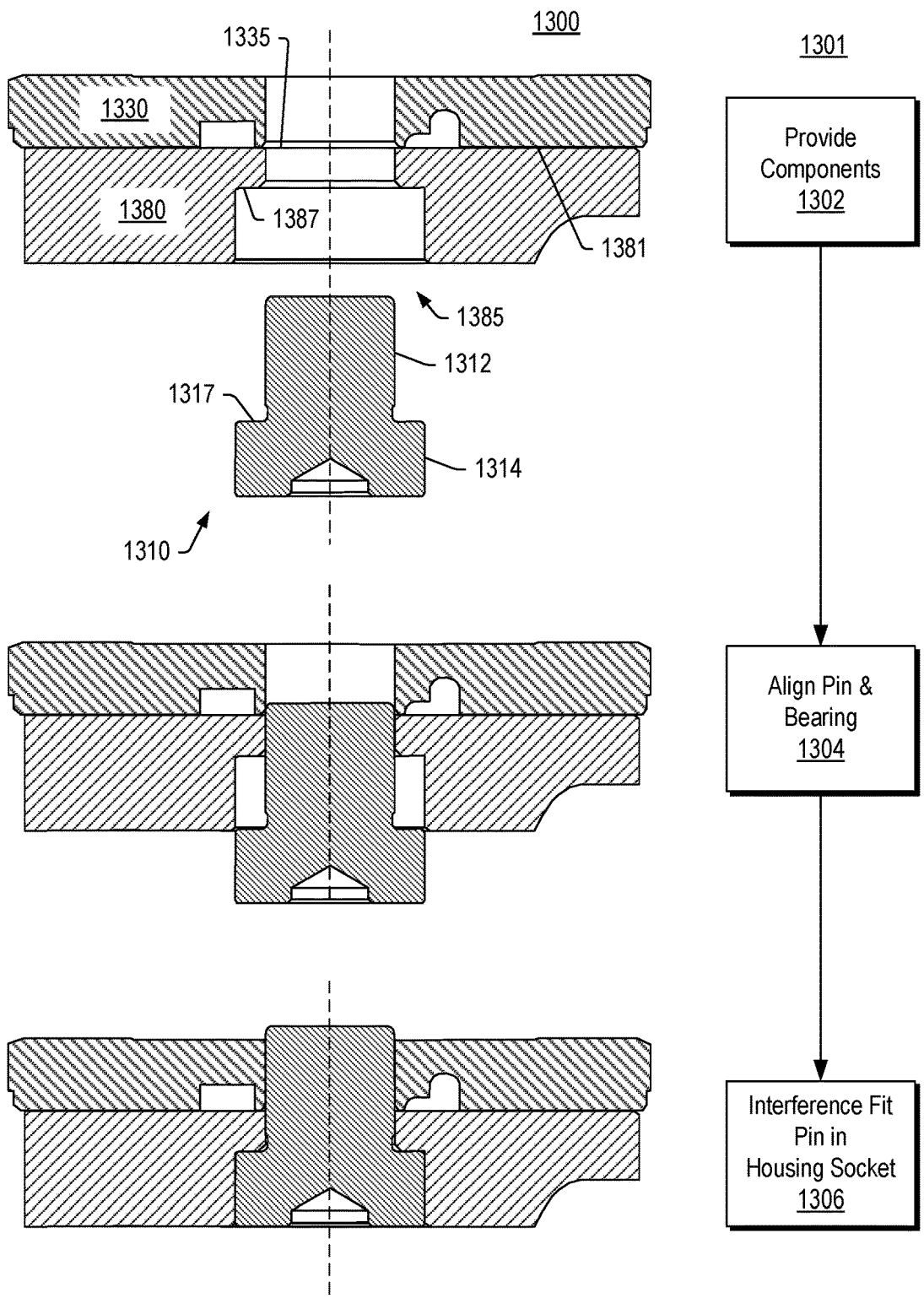
FIG. 13 is a series of cross-sectional views of a portion of an example of an assembly along with a block diagram of an example of a method.

FIG. 13 shows an example of a method 1301 and an example of an assembly 1300 that includes a stepped locating pin 1310 that includes a pin portion 1312, a seating portion 1314 and a stop surface 1317 (e.g., an axial face); a bearing 1330 that includes an opening 1335; and a housing 1380 that includes a through bore 1381 and a locating pin socket 1385 that is threadless where the locating pin socket 1385 is stepped and includes a stop surface 1387 (e.g., an axial face) and extends to the through bore 1381.

In the example of FIG. 13, an opening between the through bore 1381 and the locating pin socket 1385 can be defined by a perimeter formed by the intersection of two cylinders (see, e.g., FIG. 3). The curves of intersection of two cylinders of radii "a" and "b" are given by the parametric equations in a Cartesian coordinate system (x, y, z):

$$x(t) = b \cos(t)$$

$$y(t) = b \sin(t)$$

$$z(t) = +/- (a^2 - b^2 \sin^2(t))^{0.5}$$

In such an example, a through bore of a housing can be of a radius "a" and a portion of a locating pin socket of the housing can be of a radius "b" where such "cylinders" may intersect at right angles.

As shown in FIG. 13, the housing 1380 can be shaped differently from the housing 880. For example, in the example of FIG. 13, the locating pin socket 1385 can have an axial length that is less than a maximum diameter; whereas, in the example of FIG. 8, the locating pin socket 885 of the housing 880 is shown as having an axial length that is greater than a maximum diameter. As an example, by reducing the axial length of a locating pin socket via use of an interference fit (e.g., threadless locating pin socket), a housing may be shaped differently in a manner that can reduce mass and/or volume of the housing. Further, as an example, a locating pin may be a stepped locating pin that is of lesser mass and/or volume than a locating pin that has threads as for mating with threads of a locating pin socket of a housing.

As shown in FIG. 13, the method 1301 includes a provision block 1302 for providing components of the assembly 1300, an alignment block 1304 for aligning the stepped locating pin 1310 and the bearing 1330, and an interference fit block 1306 for interference fitting the stepped locating pin 1310 in the locating pin socket 1385 of the housing 1380. As shown in the example of FIG. 13, the stop surfaces 1317 and 1387 can contact to limit the axial depth of the stepped locating pin 1310 in the locating pin socket 1385 of the housing 1380.

In the example of FIG. 13, the axial depth of the stepped locating pin 1310 in the locating pin socket 1385 of the housing 1380 can provide for the pin portion 1312 of the stepped locating pin 1310 to extend a desired axial distance into a through bore of the housing 1380.

The alignment block 1304 of the method 1301 can include aligning an axis of the stepped locating pin 1310 with an axis of the opening 1335 of the bearing 1330. With the stepped locating pin 1310 secured via an interference fit in the locating pin socket 1385 of the housing 1380, the bearing 1330 can be disposed in the housing 1380 such that it can move radially (e.g., in a direction of the axis of the stepped locating pin 1310) with limited axial movement (e.g., consider a limited amount of movement of approximately zero for a "tight" fit or a limited amount of movement of approximately 0.1 mm to about 1 mm for a "loose" fit). As to radial movement, the bearing 1330 can, during operation, be supported in part via a lubricant film that can be defined by a clearance between an outer surface of the bearing 1330 and an inner surface of the through bore 1381 of the housing 1380.

As shown in FIG. 13, the stepped locating pin 1310 can include a recessed end feature, for example, to receive a tool for positioning and/or applying force to the stepped locating pin 1310.

Figure 14:
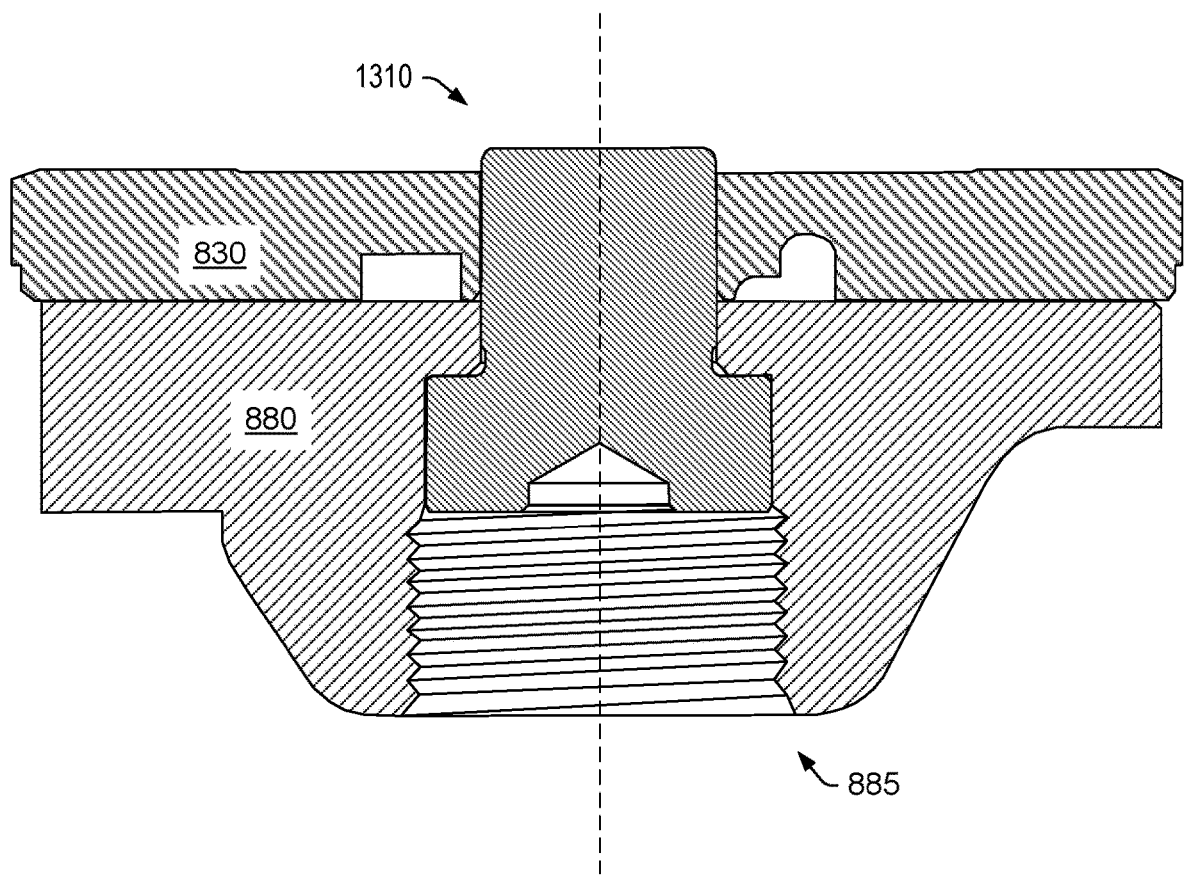
FIG. 14 is a cross-section view of a portion of an example of an assembly.

FIG. 14 shows an example of the stepped locating pin 1310 as being interference fit in the locating pin socket 885 of the housing 880 for locating the bearing 830 (e.g., or the bearing 1330). In such an example, the stepped locating pin 1310 may be of lesser mass and/or volume than the stepped locating 810.

In the example of FIG. 14, threads of the locating pin socket 885 are exposed, which may optionally be utilized for receipt of a tool, a component, etc. For example, where an assembly is to be supported during manufacture, transported with a plug, etc., the threads may be available for operatively coupling a tool, a component, etc. to the assembly. As an example, consider a drain plug that covers the drain opening 389 (e.g., for purposes of keeping debris from entering the housing) where the drain plug includes a threaded extension that can be fit into the locating pin socket 385 when a locating pin is also fit into the locating pin socket 385 (as threaded).

Figure 15:
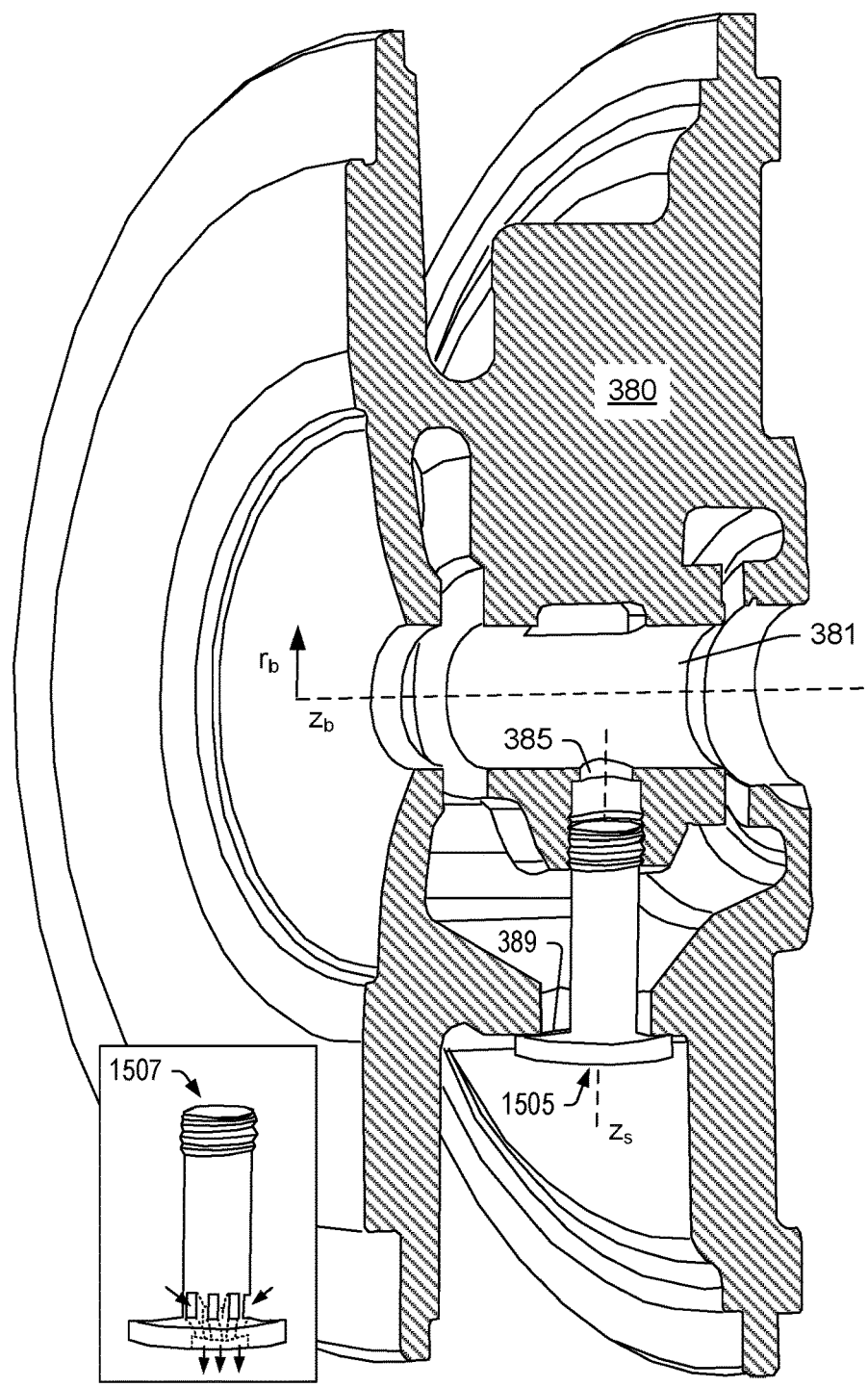
FIG. 15 is a cut-away view of an example of an assembly that includes an example of a component that is received in part by threads of a stepped locating pin socket of a center housing of a turbocharger.

FIG. 15 shows an example of the housing 380 with a component 1505 (e.g., a drain plug, etc.) received in part by the locating pin socket 385. In such an example, the locating pin socket 385 can include a stepped locating pin such as the stepped locating pin 1310 of FIG. 14 as well as a bearing such as the bearing 830 being located at least in part by the stepped locating pin. As explained with respect to FIG. 14, a stepped locating pin may have an interference fit portion that is interference fit in a stepped locating pin socket that includes threads where the threads may be exposed and, for example, available for engagement with a component such as, for example, the component 1505 as shown in FIG. 15. The component 1505 may include a socket, a hex end, etc. for purposes of rotating the component 1505 for engagement and for disengagement from the threaded portion of the locating pin socket 385. As mentioned, such a component may be a drain plug that helps to avoid debris from entering the housing during, for example, assembly, transport, installation, etc. The component 1505 may be disengaged and another component installed (e.g., a drain conduit, etc.), which may optionally be secured using threads of the locating pin socket 385 as shown in FIG. 15. In the example of FIG. 15, the component 1505 may be threadably coupled to the housing 380 without affecting a locating pin. For example, if a component were threaded to an end recess of a locating pin, movement of the component could cause movement of the locating pin, which may impact how the locating pin locates a bearing. For example, unscrewing such a component from a threaded recess of an end of a locating pin could cause movement of the locating pin; whereas, unscrewing such a component from a threaded portion of a stepped locating pin socket of a housing may be accomplished without disturbing a locating pin that is received in a seating portion of the stepped locating pin socket, which can be via an interference fit (e.g., in a threadless manner).

FIG. 15 also shows a component 1507 that may include one or more lubricant passages such that lubricant can drain via the component 1507 where, for example, a lubricant drain conduit may be operatively coupled to the component 1507. For example, the component 1507 may include a plurality of passages that allow lubricant to flow from a chamber of the center housing 380 through the lubricant drain 389 (e.g., via one or more passages of the component 1505) and to a conduit that may be operatively coupled to the component 1507 (e.g., via threads, etc.).

Tables 2 and 3, below, provide some approximate values for an M8 example and an M10 example.

TABLE 2

M8 Example

| Symbol | Description | Value |
|---|---|---|
| do | CTH bottom area width | ~15 mm |
| L | Press fit length | ~2.50 mm |
| δ | Interference | ~0.035 mm |
| μ | Coefficient of friction | ~0.150 |
| Ei | Modulus of elasticity of Pin | ~200 Gpa |
| Eo | Modulus of elasticity of CTH | ~125 Gpa |
| vi | Poisson ratio of Pin | ~0.30 |
| vo | Poisson ratio of CTH | ~0.30 |
| F | Insertion load | ~2.00 kN |
| σp | Stress in Pin | ~215 MPa |
| σc | Stress in CTH | ~527 MPa |

TABLE 3

M10 Example

| Symbol | Description | Value |
|---|---|---|
| do | CTH bottom area width | ~15 mm |
| L | Press fit length | ~2.00 mm |
| δ | Interference | ~0.035 mm |
| μ | Coefficient of friction | ~0.150 |
| Ei | Modulus of elasticity of Pin | ~200 Gpa |
| Eo | Modulus of elasticity of CTH | ~125 Gpa |
| vi | Poisson ratio of Pin | ~0.30 |
| vo | Poisson ratio of CTH | ~0.30 |
| F | Insertion load | ~1.60 kN |
| σp | Stress in Pin | ~215 MPa |
| σc | Stress in CTH | ~527 MPa |

In the examples of Tables 2 and 3, the load and stress can be reduced when compared to a press fit pin that is cylindrical (non-stepped) as press fit into a cylindrical socket (non-stepped). For example, for a press fit pin with a diameter of approximately 5.5 mm and a press fit length of approximately 8 mm, an insertion load (F) may be of the order of approximately 1 kN or more, stress in pin (σp) may be greater than 215 MPa. Such numbers can be for a smaller interference (e.g., 0.020 mm versus 0.035 mm). As to force in kN, consider 1 kN being approximately 101 kgf (e.g., approximately 225 lbf). As such, a stepped locating pin interference in a stepped locating pin socket can utilize an increased interference compared to a cylindrical/non-stepped pin in a cylindrical/non-stepped locating pin socket while reducing insertion load during assembly and, for example, stress in pin in an assembled state (interference fit state). Such an approach may reduce insertion load during an assembly process that interference fits a stepped locating pin in a stepped locating pin socket, which may reduce risk of distortion, cracking, etc. and, for example, reduce requirements as to an insertion mechanism as force may be reduced (e.g., by approximately one half or more).

As an example, a cylindrical/non-stepped locating pin in a cylindrical/non-stepped locating pin socket may be via a process that involves pushing the cylindrical/non-stepped locating pin in an axial direction toward a lubricant drain (see, e.g., the lubricant drain 389); whereas, a stepped locating pin in a stepped locating pin socket may be via a process that involves pushing the stepped locating pin in an axial direction away from a lubricant drain (see, e.g., the lubricant drain 389), which may via insertion of a tool via the lubricant drain.

Referring again to FIG. 2, where an interference fit locating pin is to be removed, as an example, a lubricant passage of a housing may be utilized for insertion of a tool that can contact an end of the locating pin to apply force to move the locating pin out of a locating pin socket of a housing. As shown in FIG. 2, the bearing 230 includes an opening that is at least partially overlapping with a lubricant passage (see, e.g., Oil Flow arrow into the housing 280). In such an example, a tool may be inserted into the lubricant passage, navigated through the opening 239 of the bearing 230, and pressed against the locating pin 210 to force the locating pin 210 axially outwardly such that the locating pin 210 disengages the bearing 230, which may allow for disassembly/removal of various components (e.g., the shaft 220, etc.).

As an example, a turbocharger can include a center housing (see, e.g., 280, 380, 480, 580, 880, 1380) that includes a through bore (see, e.g., 281, 381, 881, 1381) and a stepped locating pin socket (see, e.g., 285, 385, 485, 585, 885, 1385) that includes a stop surface (see, e.g., 887, 1387); a bearing (see, e.g., 230, 430, 530, 830, 1330) disposed in the through bore where the bearing includes an opening (see, e.g., 235, 835, 1335); and a stepped locating pin (see, e.g., 210, 410, 510, 610, 810, 1310) where the stepped locating pin includes a pin portion (see, e.g., 612, 812, 1312) received in part by the opening of the bearing and a seating portion (see, e.g., 614, 814, 1314) secured via an interference fit in the stepped locating pin socket where a maximum radius of the seating portion exceeds a maximum radius of the pin portion and where the stepped locating pin includes a stop surface (see, e.g., 617, 817, 1317) that contacts the stop surface (see, e.g., 887, 1387) of the stepped locating pin socket to axially position the stepped locating pin in the stepped locating pin socket. In such an example, the stepped locating pin socket of the housing can include a pin portion with a first radius and a seating portion with a second radius where the second radius exceeds the first radius.

As an example, a stepped locating pin socket can be threadless. As an example, a stepped locating pin can be threadless. As an example, a stepped locating pin socket can be threadless and a stepped locating pin can be threadless.

As an example, a stepped locating pin can include an end recess. For example, such an end recess may be configured to receive at least a portion of a tool, which may facilitate positioning of the stepped locating pin and/or applying force to the stepped locating pin.

As an example, a stepped locating pin may be a permanent stepped locating pin as interference fit in a stepped locating pin socket of a housing where threads are not utilized to secure the stepped locating pin.

As an example, a housing can include a lubricant passage and a bearing can include an opening that receives at least a portion of a pin portion of a stepped locating pin and another opening that is accessible via the lubricant passage.

As an example, an axial length of a seating portion of a stepped locating pin can be less than an axial length of a pin portion of the stepped locating pin.

As an example, a stepped locating pin can have a maximum diameter that exceeds an axial length of a stepped locating pin socket of a housing.

As an example, a seating portion of a stepped locating pin can be recessed in a stepped locating pin socket. In such an example, the stepped locating pin socket may include threads where at least a portion of the threads are exposed (e.g., accessible with the stepped locating pin received and interference fit in the stepped locating pin socket).

As an example, a stepped locating pin socket may include a threaded portion and a seating portion where the seating portion is threadless. As an example, a stepped locating pin socket can include a threaded portion and a seating portion where a stepped locating pin is seated in the seating portion. In such an example, a turbocharger may include a component where the component includes a threaded extension that includes threads received at least in part in the threaded portion of the stepped locating pin socket.

As an example, a stepped locating pin may be scar-less as interference fit in a stepped locating pin socket of a housing. For example, consider a process that is a thermal process whereby the stepped locating pin is interference fit without contact that would scar the stepped locating pin.

As an example, a seating portion of a stepped locating pin may be of a maximum diameter that is less than approximately 12 mm. As an example, a stepped locating pin, as secured via an interference fit in a stepped locating pin socket, can include an interference fit length in a range of approximately 1 mm to approximately 4 mm (see, e.g., FIG. 8, the axial dimension $z_5$, FIG. 13, FIG. 14, etc.).

As an example, a method can include providing a turbocharger center housing that includes a through bore and a stepped locating pin socket that includes a stop surface, a bearing disposed in the through bore where the bearing includes an opening, and a stepped locating pin where the stepped locating pin includes a pin portion and a seating portion where a maximum radius of the pin portion exceeds a maximum radius of the seating portion and where the stepped locating pin includes a stop surface; and interference fitting the seating portion of the stepped locating pin in the stepped locating pin socket where the stop surface of the stepped locating pin contacts the stop surface of the stepped locating pin socket to axially position the stepped locating pin in the stepped locating pin socket. In such an example, the method may include aligning the pin portion of the stepped locating pin with the opening of the bearing prior to the interference fitting. As an example, a method may include applying force to create an interference fit (e.g., interference fitting includes applying force via a force applicator). As an example, interference fitting may be via thermal processing. In such an example, a stepped locating pin may be a scar-less stepped locating pin.

Although some examples of methods, devices, systems, arrangements, etc., have been illustrated in the accompanying Drawings and described in the foregoing Detailed Description, it will be understood that the example embodiments disclosed are not limiting, but are capable of numerous rearrangements, modifications and substitutions.

What is claimed is:

1. A turbocharger comprising:
a center housing that comprises a through bore and a stepped locating pin socket that comprises a pin socket axis, a through bore opening, a stepped locating pin opening and an annular stop surface disposed at a step between a pin portion and a seating portion of the stepped locating pin socket, wherein the pin portion and the seating portion define a first axial distance ($z_4+z_5$) along the pin socket axis from the through bore opening to an end of the seating portion, and wherein the through bore opening and the stepped locating pin opening define a second axial distance ($z_7$) along the pin socket axis from the through bore opening to the stepped locating pin opening that is greater than the first axial distance;
a bearing disposed in the through bore wherein the bearing comprises an opening; and
a stepped locating pin wherein the stepped locating pin comprises a stepped locating pin axis, a pin portion received in part by the opening of the bearing, a seating portion, and a transition region between the pin portion and the seating portion with a minimum radius of the stepped locating pin, wherein a maximum radius of the seating portion of the stepped locating pin socket exceeds a maximum radius of the pin portion of the stepped locating pin socket, wherein the stepped locating pin comprises a stop surface adjacent to the transition region that contacts the annular stop surface of the stepped locating pin socket to axially position the stepped locating pin in the stepped locating pin socket, and wherein the pin portion and the transition region of the stepped locating pin comprise an axial length ($z_{12}+z_{13}$) along the stepped locating pin axis between an end of the stepped locating pin and the seating portion of the stepped locating pin that is greater than the first axial distance ($z_4+z_5$) and less than the second axial distance ($z_7$) to locate the stepped locating pin in the opening of the bearing prior to the formation of an interference fit between a cylindrical surface of the seating portion of the stepped locating pin and a cylindrical surface of the seating portion of the stepped locating pin socket.

2. The turbocharger of claim 1 wherein the stepped locating pin is threadless.

3. The turbocharger of claim 1 wherein the stepped locating pin comprises an end recess.

4. The turbocharger of claim 1 wherein the housing comprises a lubricant passage and wherein the bearing comprises another opening that is accessible via the lubricant passage.

5. The turbocharger of claim 1 wherein an axial length of the seating portion of the stepped locating pin is less than the axial length of the pin portion and the transition region of the stepped locating pin.

6. The turbocharger of claim 1 wherein the stepped locating pin comprises a maximum diameter that exceeds the second axial distance of the stepped locating pin socket of the housing.

7. The turbocharger of claim 1 wherein the seating portion of the stepped locating pin is recessed in the stepped locating pin socket.

8. The turbocharger of claim 1 wherein the stepped locating pin socket comprises a threaded portion and wherein the seating portion of the stepped locating pin socket is threadless.

9. The turbocharger of claim 1 wherein the stepped locating pin socket comprises a threaded portion and wherein the stepped locating pin is seated in the seating portion of the stepped locating pin socket.

10. The turbocharger of claim 9 comprising a component wherein the component comprises a threaded extension that comprises threads received at least in part in the threaded portion of the stepped locating pin socket.

11. The turbocharger of claim 1 wherein the stepped locating pin is scar-less.

12. The turbocharger of claim 1 wherein the seating portion of the stepped locating pin comprises a diameter less than 12 mm.

13. The turbocharger of claim 1 wherein the stepped locating pin, as secured via the interference fit in the stepped locating pin socket, comprises an interference fit length in a range of 1 mm to 4 mm.

14. A method comprising:
providing a turbocharger center housing that comprises a through bore and a stepped locating pin socket that comprises a stop surface, a bearing disposed in the through bore wherein the bearing comprises an opening, and a stepped locating pin wherein the stepped locating pin comprises a pin portion, a seating portion, and a transition region between the pin portion and the seating portion with a minimum radius of the stepped locating pin, wherein a maximum radius of the pin portion is less than a maximum radius of the seating portion and wherein the stepped locating pin comprises a stop surface;
positioning the stepped locating pin partially in the stepped locating pin socket;
locating the pin portion of the stepped locating pin in the opening of the bearing without utilizing an interference fit or threads; and
interference fitting a cylindrical surface of the seating portion of the stepped locating pin against a cylindrical surface in the stepped locating pin socket wherein the stop surface of the stepped locating pin contacts the stop surface of the stepped locating pin socket to axially position the stepped locating pin in the stepped locating pin socket.

15. The method of claim 14 wherein the interference fitting comprises thermal processing and wherein the stepped locating pin comprises a scar-less stepped locating pin.

16. A turbocharger comprising: a center housing that comprises a through bore and a stepped locating pin socket that comprises a through bore opening, a stepped locating pin opening, a step from a smaller diameter pin portion to a larger diameter threadless seating portion and a threaded portion between the threadless seating portion and the stepped locating pin opening, wherein the step forms a stop surface defined by a smaller inner diameter and a larger outer diameter of the stepped locating pin socket; a bearing disposed in the through bore wherein the bearing comprises an opening; and a stepped locating pin, wherein the stepped locating pin comprises a step from a smaller diameter pin portion, received in part in the pin portion of the stepped locating pin socket and in part by the opening of the bearing, to a larger diameter seating portion, secured via an interference fit between a cylindrical surface of the seating portion of the stepped locating pin and a cylindrical surface in the seating portion of the stepped locating pin socket, wherein the step of the stepped locating pin forms a stop surface that contacts the stop surface of the stepped locating pin socket to axially position the stepped locating pin in the stepped locating pin socket.

\* \* \* \* \*